(12) United States Patent
Kim et al.

(10) Patent No.: US 10,979,953 B2
(45) Date of Patent: Apr. 13, 2021

(54) METHOD FOR OFFLOADING TRAFFIC BY MEANS OF WIRELESS LAN IN MOBILE COMMUNICATIONS SYSTEM AND APPARATUS THEREFOR

(71) Applicant: Samsung Electronics Co., Ltd., Suwon-si (KR)

(72) Inventors: Soenghun Kim, Suwon-si (KR); Jaehyuk Jang, Suwon-si (KR); Kyeongin Jeong, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 38 days.

(21) Appl. No.: 14/779,447

(22) PCT Filed: Mar. 25, 2014

(86) PCT No.: PCT/KR2014/002473
§ 371 (c)(1),
(2) Date: Sep. 23, 2015

(87) PCT Pub. No.: WO2014/157898
PCT Pub. Date: Oct. 2, 2014

(65) Prior Publication Data
US 2016/0050605 A1    Feb. 18, 2016

(30) Foreign Application Priority Data

Mar. 26, 2013  (KR) ......................... 10-2013-0032193
Apr. 5, 2013   (KR) ......................... 10-2013-0037738
May 10, 2013   (KR) ......................... 10-2013-0053258

(51) Int. Cl.
H04W 36/08     (2009.01)
H04W 28/08     (2009.01)
(Continued)

(52) U.S. Cl.
CPC ....... *H04W 36/22* (2013.01); *H04W 28/0263* (2013.01); *H04W 28/0278* (2013.01);
(Continued)

(58) Field of Classification Search
CPC ..... H04W 36/22; H04W 28/08; H04W 36/08; H04W 36/14; H04W 76/048
See application file for complete search history.

(56) References Cited

U.S. PATENT DOCUMENTS 9,603,075 B2      3/2017  Zhao et al.
2007/0019575 A1*  1/2007  Shaheen ........... H04W 36/0094
                                                 370/310
(Continued)

FOREIGN PATENT DOCUMENTS

CN   102026324 A   4/2011
CN   102440051 A   5/2012
(Continued)

OTHER PUBLICATIONS

Korean Office Action dated Feb. 18, 2019, issued in Korean Patent Application No. 10-2013-0053258.
(Continued)

*Primary Examiner* — Charles C Jiang
*Assistant Examiner* — Voster Preval
(74) *Attorney, Agent, or Firm* — Jefferson IP Law, LLP

(57) ABSTRACT

The present invention relates to a method for offloading traffic by means of wireless LAN in a mobile communications system and apparatus therefor, and more particularly to a method for a terminal to offload traffic at a bearer level, and to a base station communicating with the terminal. The method for a terminal to offload traffic according to the present invention includes the steps of: while performing a data communication with a base station through a bearer of a first communications network, receiving from the base (Continued)

station an offloading command for offloading a part of traffic to a second communications network; transmitting a report of the offloading to the base station in response to the offloading command; and performing a data communication of the partial traffic with an accessible AP through a bearer of the second communications network without releasing the bearer of the first communications network.

4 Claims, 21 Drawing Sheets

(51) Int. Cl.
  H04W 36/14     (2009.01)
  H04W 36/22     (2009.01)
  H04W 76/28     (2018.01)
  H04W 28/02     (2009.01)

(52) U.S. Cl.
  CPC .......... *H04W 28/08* (2013.01); *H04W 36/08* (2013.01); *H04W 36/14* (2013.01); *H04W 76/28* (2018.02)

(56) References Cited

U.S. PATENT DOCUMENTS

| | | | |
|---|---|---|---|
| 2010/0061482 A1* | 3/2010 | Lee | H04B 7/0682 375/296 |
| 2010/0189002 A1* | 7/2010 | Choi | H04B 7/0617 370/252 |
| 2010/0316034 A1* | 12/2010 | Burbidge | H04W 60/00 370/338 |
| 2011/0039593 A1 | 2/2011 | Lee et al. | |
| 2011/0170469 A1 | 7/2011 | Watfa et al. | |
| 2011/0249641 A1 | 10/2011 | Kwon et al. | |
| 2011/0319069 A1* | 12/2011 | Li | H04W 8/22 455/422.1 |
| 2012/0176926 A1 | 7/2012 | Jang et al. | |
| 2012/0182896 A1 | 7/2012 | Jang et al. | |
| 2012/0322480 A1 | 12/2012 | Hoover et al. | |
| 2013/0028223 A1 | 1/2013 | Kim et al. | |
| 2013/0039342 A1* | 2/2013 | Kazmi | H04W 48/16 370/331 |
| 2013/0041981 A1 | 2/2013 | Kim et al. | |
| 2013/0064103 A1 | 3/2013 | Koskela et al. | |
| 2013/0121299 A1 | 5/2013 | Kim et al. | |
| 2013/0242796 A1 | 9/2013 | Chen et al. | |
| 2014/0066054 A1 | 3/2014 | Jung et al. | |
| 2014/0133298 A1* | 5/2014 | Han | H04W 28/08 370/230 |
| 2014/0133428 A1* | 5/2014 | Kazmi | H04W 24/02 370/329 |
| 2014/0328228 A1* | 11/2014 | Park | H04L 5/0092 370/280 |
| 2015/0117328 A1 | 4/2015 | Llairo et al. | |
| 2015/0162966 A1* | 6/2015 | Kim | H04L 1/20 370/252 |
| 2015/0230112 A1* | 8/2015 | Siomina | G01S 5/0205 370/252 |
| 2015/0304860 A1* | 10/2015 | Liu | H04W 16/32 370/329 |
| 2015/0318908 A1* | 11/2015 | Ko | H04B 7/0617 375/267 |
| 2015/0341148 A1* | 11/2015 | Kazmi | H04L 5/0098 370/252 |

FOREIGN PATENT DOCUMENTS

| | | |
|---|---|---|
| CN | 102474377 A | 5/2012 |
| CN | 102740470 A | 10/2012 |
| EP | 2 629 566 A1 | 8/2013 |
| KR | 10-2011-0113484 A | 10/2011 |
| KR | 10-2012-0104622 A | 9/2012 |
| KR | 10-2013-0017857 A | 2/2013 |
| WO | 2011126311 A2 | 10/2011 |
| WO | 2012-011657 A2 | 1/2012 |
| WO | 2012/006691 A3 | 4/2012 |
| WO | 2012-067406 A2 | 5/2012 |
| WO | 2012/092792 A1 | 7/2012 |
| WO | 2012/144731 A2 | 10/2012 |
| WO | 2013-011088 A1 | 1/2013 |
| WO | 2013/172769 A1 | 11/2013 |

OTHER PUBLICATIONS

Nokia Corporation, "Interruptions for Scell activation/deactivation", 3GPP Draft; R4-122719, 3rd Generation Partnership Project (3GPP), Mobile Competence Centre; 650, Route Des Lucioles; F-06921 Sophia-Antipolis Cedex; France, vol. RAN WG4, No. Prague, May 14, 2012, XP050614025.
European Office Action dated Oct. 17, 2018, issued in European Patent Application No. 14773679.7.
Indian Office Action dated Aug. 27, 2019, issued in Indian Patent Application No. 3122/KOLNP/2015.
"8.14 E-UTRAN TDD—FDD Inter-frequency Measurements", 3GPP Draft; 36521-3-B00_S08E-Sannexes, 3rd Generation Partnership Project (3GPP), Mobile Competence Centre; 650, Route Des Lucioles; F-06921 Sophia-Antipolis Cedex; France, vol. TSG SA Mar. 18, 2013, XP051674680, Mar. 18, 2013.
Extended European Search Report dated Nov. 2, 2020, issued in European Application No. 20184434.7-1215.

* cited by examiner

METHOD FOR OFFLOADING TRAFFIC BY MEANS OF WIRELESS LAN IN MOBILE COMMUNICATIONS SYSTEM AND APPARATUS THEREFOR

TECHNICAL FIELD

The present invention relates to a method and an apparatus for offloading traffic by using a Wireless Local Area Network (WLAN) in a mobile communication system and, more particularly, to a method for offloading traffic at a bearer level.

BACKGROUND ART

Recently, wireless communication technology has achieved rapid progress, and accordingly, communication system technology has also repeatedly evolved. As a result, there is a Universal Mobile Telecommunications System (UMTS) system as the third generation (3G) mobile communication technology, and it is a Long-Term Evolution (LTE) system that is spotlighted as the fourth generation (4G) mobile communication technology.

Particularly, in today's wireless communication system, data usage amount of users has exploded according to the spread of smart phones, and an attempt is made to distribute the data usage amount by additionally interworking a WLAN network with an existing mobile communication network (i.e., a 3G cellular network and a 4G cellular network) in order to deal with the exploding data usage amount.

However, the current technology cannot deal with closely interworking the cellular network with the WLAN network. Specifically, currently, the cellular network and the WLAN network independently operate except for some limited functions (e.g., authentication).

Accordingly, when a user equipment, which does not know a location at which a WLAN network is located, desires to use the WLAN network, the user equipment needs to continuously search for a neighboring WLAN network, which results in the power consumption of the user equipment. Also, a problem arises in that WLAN power of the user equipment needs to be always turned on in order to search for a neighboring WLAN network.

Even when the user equipment has found an available WLAN network and accesses the available WLAN network, the user equipment needs to release the connection with the current cellular network and needs to transmit/receive all traffics of the user equipment to/from the available WLAN network, and thus service quality, that a user of the user equipment actually feels, may be degraded. Also, when user data, such as Voice over Internet Protocol (VoIP) in which a real-time property is important, a Radio Resource Control (RRC) message, or the like is transmitted/received through the WLAN, the WLAN may not provide service quality that the relevant service requires.

Further, due to a limitation on the coverage of the WLAN network, a case may occur in which the user equipment that has used the WLAN network needs to come back to the wireless cellular network (e.g., an LTE network). Service quality, that the user actually feels, may be seriously degraded when the user equipment has released the connection with the LTE network and re-accesses the LTE network in a process during which the user equipment sets up access to the WLAN network and releases the access thereto.

DISCLOSURE OF INVENTION

Technical Problem

The present invention provides a method and an apparatus for offloading traffic at a bearer level by using a WLAN in a bearer mobile communication system.

Solution to Problem

In order to solve the above-mentioned technical problems, in accordance with an aspect of the present invention, a method for offloading traffic by a user equipment is provided. The method includes: receiving, from a base station, an offload command for offloading partial traffic to a second communication network while performing data communication with the base station through a bearer of a first communication network; transmitting an offload report to the base station in response to the offload command; and performing, by the user equipment, data communication related to the partial traffic with an accessible Access Point (AP) through a bearer of the second communication network without releasing the bearer of the first communication network.

Also, in accordance with another aspect of the present invention, a method for offloading traffic by a base station is provided. The method includes: transmitting, to a user equipment, an offload command for offloading partial traffic to a second communication network while performing data communication with the user equipment through a bearer of a first communication network; receiving an offload report from the user equipment in response to the offload command; and forwarding data related to the partial traffic to an Access Point (AP), with which the user equipment is capable of communicating, without releasing the bearer of the first communication network.

Also, in accordance with still another aspect of the present invention, there is provided a user equipment which includes: a transmission/reception unit for performing data communication with a base station or an Access Point (AP); and a control unit for controlling the transmission/reception unit to transmit an offload report to the base station in response to the offload command, in such a manner that the user equipment performs data communication related to the partial traffic with an accessible Access Point (AP) through a bearer of a second communication network without releasing a bearer of a first communication network, when the transmission/reception unit receives, from the base station, an offload command for offloading partial traffic to the second communication network while the transmission/reception unit performs data communication with the base station through the bearer of the first communication network.

Further, in accordance with yet another aspect of the present invention, there is provided a base station which includes: a transmission/reception unit for performing data communication with a user equipment; and a control unit for controlling the transmission/reception unit to transmit, to a user equipment, an offload command for offloading partial traffic to a second communication network while the transmission/reception unit performs data communication with the user equipment through a bearer of a first communication network, to receive an offload report from the user equipment in response to the offload command, and to forward data related to the partial traffic to an Access Point (AP), with which the user equipment is capable of communicating, without releasing the bearer of the first communication network.

Advantageous Effects of Invention

The present invention can effectively support the offload of user traffic by using a WLAN in a mobile communication system, and can minimize a service interruption phenomenon occurring during the offload.

MODE FOR THE INVENTION

In the following description of the present disclosure, a detailed description of known configurations or functions incorporated herein will be omitted when it is determined that the detailed description may make the subject matter of the present disclosure unclear. Hereinafter, embodiments of the present disclosure will be described with reference to the accompanying drawings.

The present invention relates to a method and an apparatus in which a user equipment capable of accessing a wireless cellular network and a WLAN network transmits/receives a part of data through the WLAN network. Hereinafter, before the description of the present invention, an LTE system will be briefly described.

In the present invention, for convenience of description, the description will focus on an LTE system as an example of a cellular network, but the present invention can all be applied to other cellular networks (e.g., a UMTS).

Figure 1:
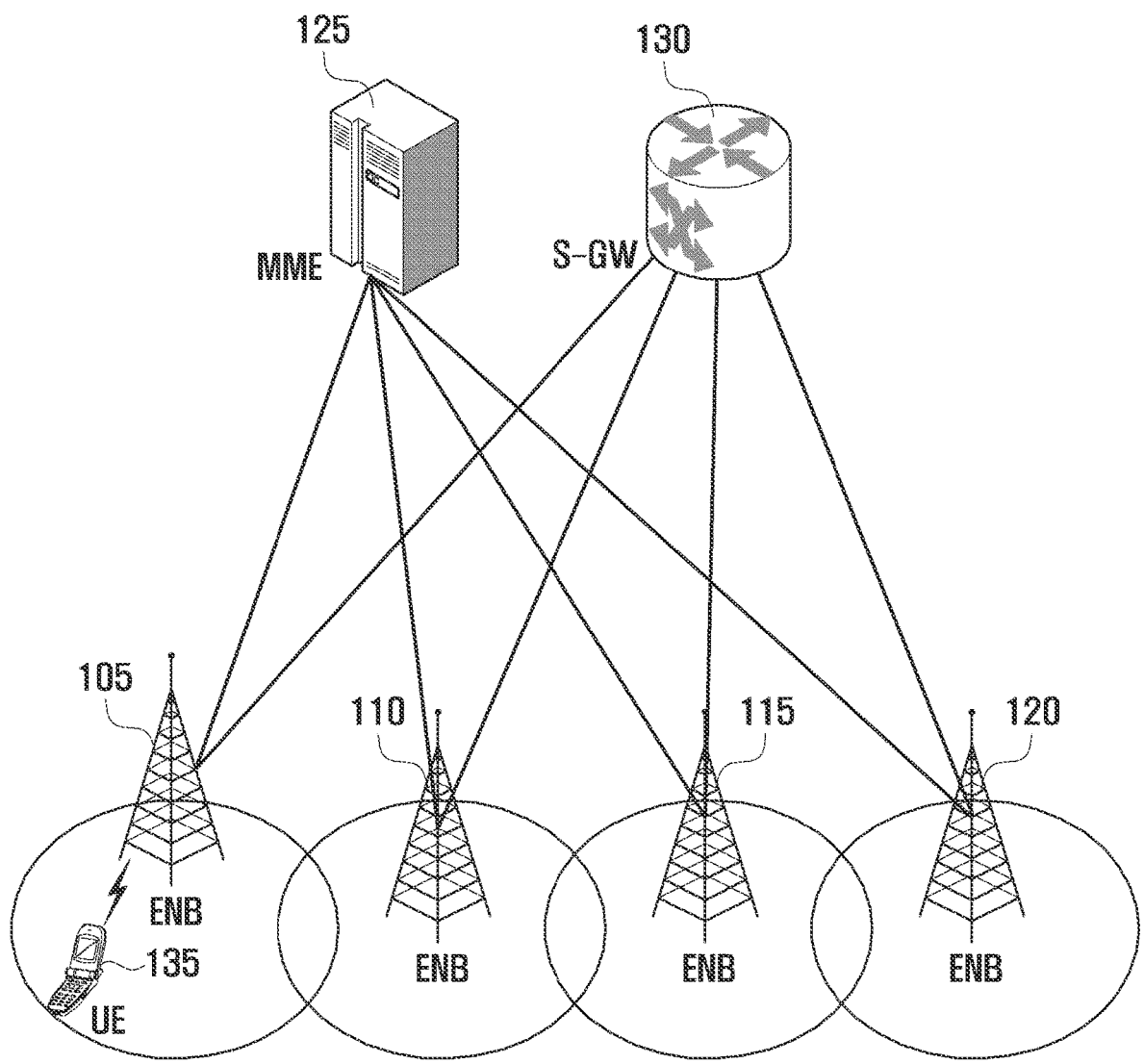
FIG. 1 is a view illustrating a configuration of an LTE system, to which the present invention is applied.

FIG. 1 is a view illustrating a configuration of an LTE system, to which the present invention is applied.

Referring to FIG. 1, a radio access network of the LTE system includes one or more ENBs (next-generation base stations, Evolved Node Bs, Node Bs, or base stations) 105, 110, 115 and 120, a Mobility Management Entity (MME) 125, a Serving-Gateway (S-GW) 130, and a User Equipment (hereinafter a "UE" or a "terminal") 135.

The UE 135 accesses an external network through the ENB 105, 110, 115, or 120 and the S-GW 130.

The ENBs 105, 110, 115 and 120 each correspond to a Node B of the existing UMTS system. The ENB 105, 110, 115, or 120 is connected to the UE 135 through a wireless channel, and plays a more complex role than the existing Node B.

In the LTE system, since all user traffic including real-time services, such as VoIP, is serviced through a shared channel, there is a need for a device for collecting status information, such as a buffer status of the UEs 135s, an available transmission power status thereof, a channel status thereof, etc., and performing scheduling depending thereon, and the ENBs 105, 110, 115 and 120 serve as the device.

One ENB 105, 110, 115, or 120 typically controls multiple cells. For example, in order to achieve a transmission speed of 100 Mbps, the LTE system uses Orthogonal Frequency Division Multiplexing (OFDM) in a bandwidth of 20 MHz as radio access technology. Also, the LTE system applies an Adaptive Modulation & Coding (AMC) scheme which determines a modulation scheme and a channel coding rate according to a channel status of the UE 135.

The MME 125 is a device in charge of various control functions as well as a mobility management function for the UE, and is connected to multiple ENBs.

The S-GW 130 is a device for providing a data bearer, and generates or removes a data bearer under the control of the MME 125.

Figure 2:
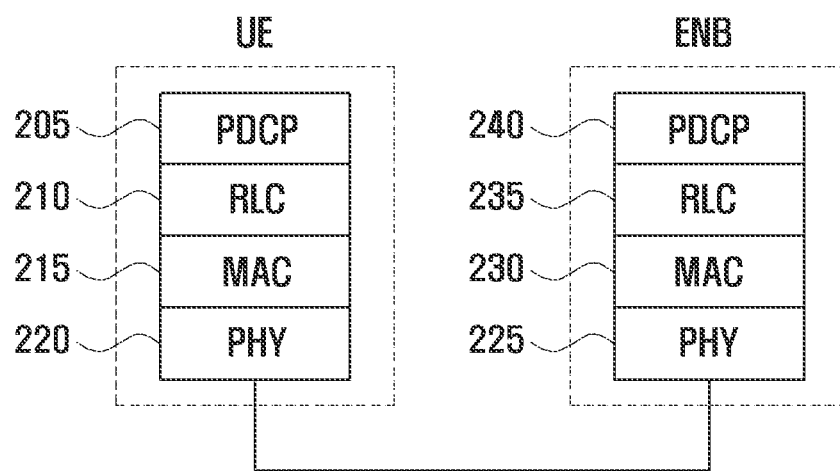
FIG. 2 is a view illustrating a structure of a wireless protocol in an LTE system, to which the present invention is applied.

FIG. 2 is a view illustrating a structure of a wireless protocol in an LTE system, to which the present invention is applied.

Referring to FIG. 2, the wireless protocol of the LTE system includes Packet Data Convergence Protocol (PDCP) 205 and 240, Radio Link Control (RLC) 210 and 235, Medium Access Control (MAC) 215 and 230, and Physical Layer (PHY) 220 and 225 in each of the UE and the ENB.

The PDCP 205 and 240 is in charge of operations, such as IP header compression/decompression and the like.

The RLC 210 and 235 reconfigures a PDCP Packet Data Unit (PDU) into a suitable size.

The MAC 215 and 230 is connected to multiple RLC layer entities configured in one UE. Also, the MAC 215 and 230 performs an operation of multiplexing RLC PDUs into a MAC PDU and demultiplexing RLC PDUs from a MAC PDU.

The PHY 220 and 225 channel-codes and modulates higher layer data into OFDM symbols, and transmits the OFDM symbols through a wireless channel. Also, the PHY 220 and 225 demodulates and channel-decodes OFDM symbols received through a wireless channel and transfers the decoded OFDM symbols to a higher layer.

The PHY 220 and 225 may use Hybrid Automatic Retransmit reQuest (HARQ) for additional error correction. A reception side transmits 1-bit information, which indicates whether the reception side receives a packet transmitted by a transmission side, to the transmission side. The 1-bit information is referred to as "HARQ ACKnowledgement/Negative ACKnowledgement (ACK/NACK) information." The downlink HARQ ACK/NACK information corresponding to uplink transmission may be transmitted through a Physical Hybrid-ARQ Indicator CHannel (PHICH) physical channel, and the uplink HARQ ACK/NACK information corresponding to downlink transmission may be transmitted through a Physical Uplink Control CHannel (PUCCH) physical channel or Physical Uplink Shared CHannel (PUSCH) physical channel.

Hereinafter, offload using the existing WLAN in the LTE system will be described.

Figure 3:
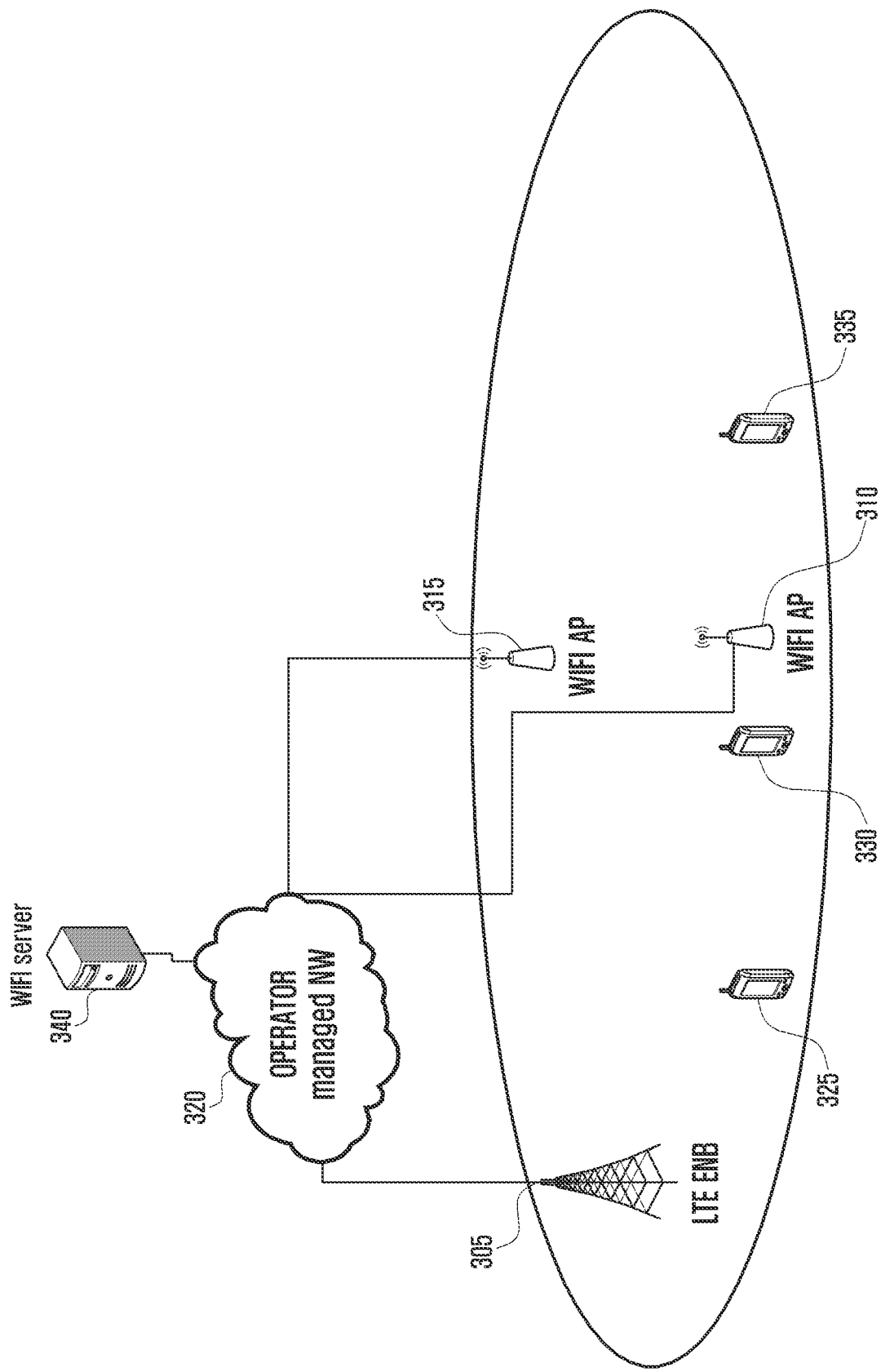
FIG. 3 is a view explaining typical WLAN offload.

FIG. 3 is a view explaining typical WLAN offload.

Today's LTE system provides offload using a WLAN network in order to meet an exploding wireless data demand. Particularly, it emerges as a powerful service model that an operator independently builds a WLAN network and provides WLAN services to only subscribers of the operator.

Referring to FIG. 3, multiple WLAN Access Points (APs) 310 and 315 are deployed within the coverage of an LTE ENB 305, and the APs 310 and 315 and the LTE ENB 305 are connected to an operator's wired network (OPERATOR managed NW) 320.

When the UE is located in an area that only an LTE radio signal reaches (hereinafter "LTE coverage") as indicated by reference numeral 325, all user traffic is transmitted/received through an LTE network. In contrast, when the UE has moved toward the APs 310 and 315 and is located in an area that an LTE radio signal and a WIFI radio signal both reach (hereinafter "WIFI coverage") as indicated by reference numeral 330, the operator may release the LTE connection of the UE and may set the UE in such a manner that user traffic is transmitted/received through the APs 310 and 315.

Thereafter, when the UE has left the WIFI coverage and is located again in the LTE coverage as indicated by reference numeral 335, the LTE ENB 305 newly establishes a connection with the UE and again transmits/receives user traffic through the LTE wireless network.

The operator may be provided with a WIFI server 340 in order to provide the UE with WIFI offload-related information. The UE may acquire the WIFI offload-related information (e.g., an offload policy, etc.) from the WIFI server 340.

When, as described above, the UE releases the RRC connection and resets up an RRC connection whenever the UE performs WIFI offload, in the LTE network, there arises a problem such that the number of RRC connection-related control messages rapidly increases and the transmission/reception of user traffic is stopped, and the like.

These problems can be solved by maintaining the RRC connection without releasing the RRC connection even when the UE enters the WIFI coverage. Alternatively, these problems may be solved in such a manner that, according to the type of service, only some services, for example, non-real-time services such as a File Transfer Protocol (FTP) and the like which cause a large amount of data traffic, are serviced through WIFI, and that a voice service and the like, which have strong requirements for service quality, are serviced through LTE.

Accordingly, the present invention proposes a method in which the UE maintains the RRC connection even when the UE enters the WIFI coverage while, according to the type of service, only some services are serviced through WIFI and the remaining services are serviced through the LTE wireless network. The offload method proposed by the present invention is hereinafter referred to as "bearer level offload."

First Embodiment

Figure 4:
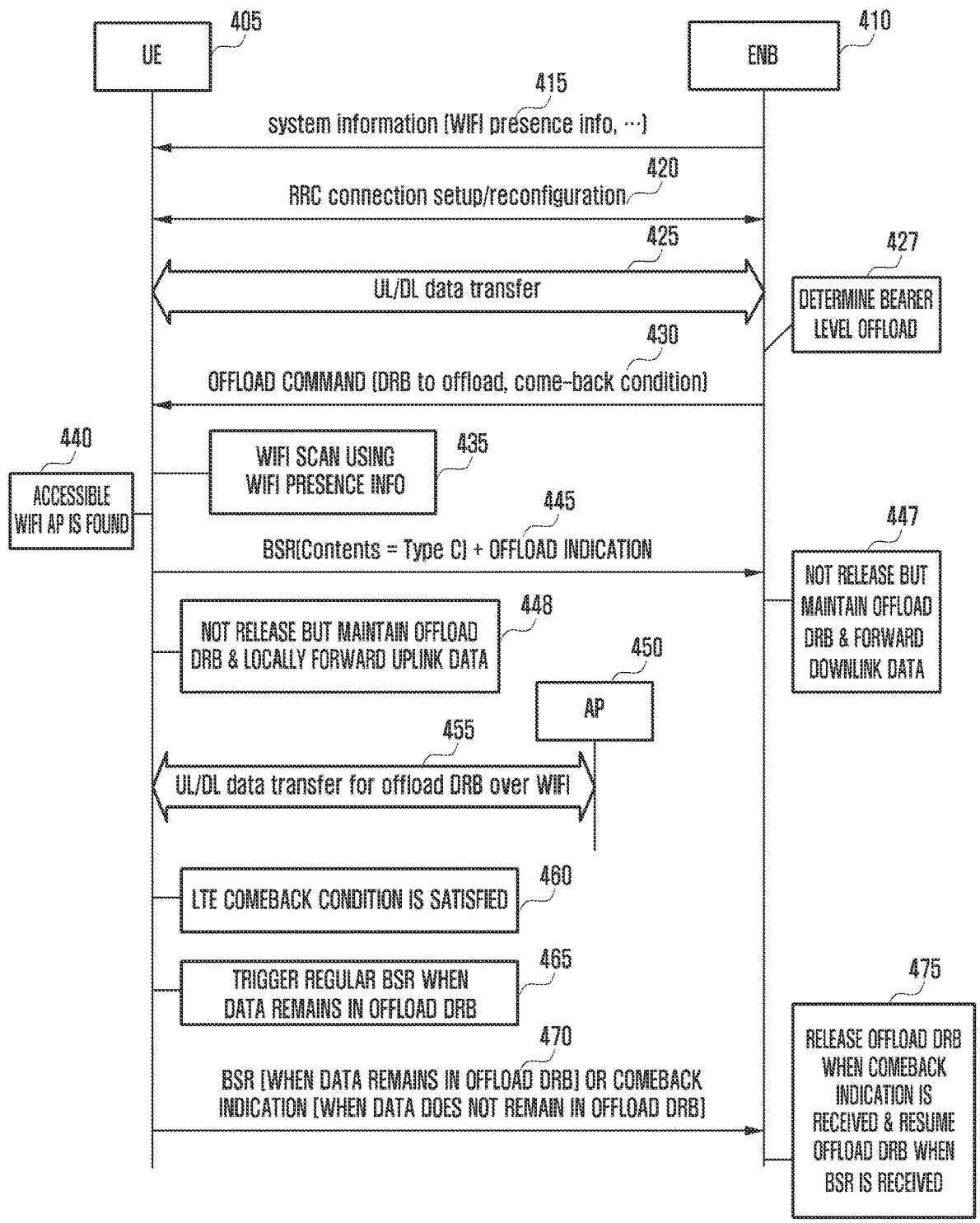
FIG. 4 is a flow diagram illustrating an example of bearer level WIFI offload according to an embodiment of the present invention.

FIG. 4 is a flow diagram illustrating an example of bearer level WIFI offload according to an embodiment of the present invention.

First, in step 415, an ENB 410 transmits system information to a UE 405 located in the coverage of the ENB 410. At this time, when a WIFI network accessible to the coverage of the ENB 410 exists, the ENB 410 provides WIFI-related information to the UE 405 through the system information. When the WIFI-related information is referred to as "common WIFI information," the common WIFI information may include the elements below.

[Common WIFI Information]
Whether there exists an accessible WIFI AP within an area of a serving cell
WIFI channel information
WIFI AP location information (e.g., location information or Global Positioning System (GPS) coordinate information with an LTE radio signal received signal strength as a reference)
A list of neighboring frequencies at which an accessible WIFI network exists (or Service Set IDentifier (SSID) information of a WIFI network for each neighboring frequency)

The reason why the information is referred to as "common WIFI information" is because the information is commonly provided to multiple unspecified UEs.

The UE 405 may support a WIFI offload function, and may currently receive a WIFI service from an operator. The UE 405 stores the WIFI-related information, namely, the common WIFI information, which has been received from ENB 410.

In step 420, when a need occurs to transmit/receive data for a certain reason, the UE 405 performs an RRC connection setup process and an RRC connection reconfiguration process with the ENB 410. The UE 405 and the ENB 410 establish a Signaling Radio Bearer (SRB) through the RRC connection setup process, and establish a Data Radio Bearer (DRB) through the RRC connection reconfiguration process. The SRB is a radio bearer for transmitting/receiving an RRC message and a higher layer control message, and the DRB is a radio bearer for transmitting/receiving user data. A radio bearer provides a predetermined service quality according to the establishment of the radio bearer. A DRB may be established for each service in order to be able to meet a Quality of Service (QoS) requirement of a service. When services having similar required service qualities exist, the services may be serviced through one DRB. After the RRC connection reconfiguration process is completed, the UE 405 may report WIFI offload support-related UE information to the network. The WIFI offload support-related UE information may be the elements below.

[UE Information on WIFI Offload Support]
Information on the WIFI network that the UE can access. For example, there may be SSID information of an AP that the UE can access.
Bearer-related information to which the UE may apply offload. For example, there may be information, such as QoS Class Identifier (QCI) information or Evolved Packet System (EPS) bearer identifier information to which WIFI offload is applied.

The UE 405 may previously receive the WIFI offload support-related UE information from a WIFI server.

Next, in step 425, the UE 405 transmits/receives downlink data and uplink data to/from the ENB 410 through the established radio bearer.

In step 430, the ENB 410 determines that the ENB 410 performs bearer level offload on a part of traffic of the UE 405 for a certain reason at a certain time point. Specifically, the ENB 410 determines that the ENB 410 offloads a part of traffic to WIFI on the basis of whether offload is required and whether a state of data transmission/reception meets an offload condition. Hereinafter, for convenience of description, a bearer to which WIFI offload is applied is named a "WIFI offload bearer." A WIFI offload bearer may be mapped to a WIFI offload IP flow, a WIFI offload EPS bearer, and a WIFI offload DRB, and hereinafter, these terms are used together.

The ENB 410 may determine that the ENB 410 offloads, for example, an IP flow, which generates massive non-real-time data, to WIFI. Specifically, the ENB 410 offloads an EPS bearer or a DRB, which is mapped to the IP flow, to WIFI.

When a UE exists which is determined to increase the generation amount of non-real-time data and to be located near an accessible WIFI network among UEs supporting WIFI offload, the ENB 410 may determine that the ENB 410 offloads a part of traffic of the UE to WIFI.

In step 430, when the bear level offload has been determined, the ENB 410 transmits an offload command control message including the following information to the UE 405.

Offload Bearer Identifier
As described above, it is desirable to offload only some DRBs all having a low service requirement to WIFI, and the ENB 410 notifies the UE 405 of an identifier of a DRB (or an identifier of an EPS bearer) to be offloaded.

Also, in another method, the UE may directly select an offload bearer on the basis of an offload policy.

LTE Comeback Condition
An LTE comeback condition is information on a condition for stopping WIFI offload and coming back to LTE. Details will be described below.

An offload policy is provided from the WIFI server to the UE, and may be the elements below.

[Offload Policy]
WIFI offload-related operator information (e.g., a Public Land Mobile Network (PLMN) id)
WIFI offload-related SSID; SSID information to which the UE may apply WIFI offload. The UE determines that a WIFI network, through which the SSID is broadcasted, is an accessible WIFI network.
WIFI offload-related QoS information; WIFI offload is applied to only traffic of indicated QoS. The QoS may be expressed by information called QCI, and a QCI is assigned for each bearer. Accordingly, the policy may be such that traffic is processed through WIFI with respect to data of a bearer, for which a QCI x is set, when accessible WIFI exists, and traffic is not processed through WIFI with respect to data of a bearer, for which a QCI y is set, even when accessible WIFI exists.
A WIFI offload-related EPS bearer identifier. Offload is applied to only an EPS bearer having the indicated identifier In step 435, the UE 405, which has received the offload command control message, scans for an accessible WIFI AP existing around the UE 405 by using common WIFI information.

When the accessible WIFI AP is found in step 440, the UE 405 proceeds to the next step. When the accessible WIFI AP is not found in step 440, the UE 405 continuously performs the WIFI scan. At this time, in order to reduce the battery consumption of the UE 405, the UE 405 may periodically perform WIFI scan, and a cycle of the WIFI scan may be adjusted according to the current speed or an LTE channel situation of the UE 405. For example, as the UE 405 has a higher operation speed and the LTE channel situation becomes worse, the UE 405 may adjust the WIFI scan cycle to be shorter. Alternatively, the UE 405 may adjust the WIFI scan cycle on the basis of the WIFI scan cycle that the ENB 410 has indicated through the offload command control message.

Next, in step 445, in order to report that the accessible WIFI AP has been found, the UE 405 generates an offload report control message and transmits the generated offload report control message to the ENB 410. The offload report control message includes, for example, the pieces of information below.

The channel status/signal quality of the found AP (or WLAN)
An SSID of the found AP (or WLAN)
Load information of the found AP (or WLAN)
An offload DRB list The UE 405 acquires the SSID and the load information of the AP through a beacon signal that the AP periodically transmits.

Also, in order to notify the ENB 410 of a buffer status change of the DRB to be offloaded, the UE 405 triggers a regular Buffer Status Report (BSR), and transmits the regular BSR and the control message together to the ENB 410.

The BSR is a control message through which the UE 405 reports the amount of data to be transmitted to the ENB 410, and is triggered when a predetermined condition is satisfied. According to the related art, the periodic expiration of a timer, the generation of data having a high priority, and the like are defined as trigger conditions of the BSR. In the present invention, the following trigger conditions of the BSR are added thereto.

[WIFI Offload-Related BSR Generation Conditions]
An AP (or a WLAN network) in which bearer level WIFI offload is to be executed is found or an accessible AP (or a WLAN network) is found after an offload command control message is received from the ENB; and
A buffer status of an offload DRB has previously been reported to the current serving ENB (or a buffer status of an offload DRB has ever been reported in a current serving cell),
A value, which is most recently reported as the data amount of the offload DRB, is greater than zero.

When the condition is satisfied, the UE 405 triggers a regular BSR to the ENB 410. At this time, the UE 405 reports only the amount of type C data to the ENB 410 instead of reporting the amount of all data. The type C data of a certain DRB refers to data which needs to be retransmitted among data stored in a transmission buffer of the DRB, and will be described in more detail below with reference to FIG. 6.

Alternatively, in order to reduce the complexity of the UE 405, the UE 405 may report a predetermined value (e.g., 0 byte), in which the actual data amount is not reflected, to the ENB 410 as a buffer status of the offload DRB. Specifically, when the WIFI offload-related BSR generation condition is satisfied, the UE 405 may simplify an operation by triggering a regular BSR, which represents the buffer status of the offload DRB as 0 byte, to the ENB 410.

When the regular BSR is triggered, the UE 405 sends a request for transmission resources to the ENB 410 in order to transmit the BSR. In contrast, even when another BSR (e.g., a periodic BSR) is triggered, the UE 405 does not send a request for transmission resources to the ENB 410 in order to only transmit the BSR.

The ENB 410, which has received the offload report control message and the BSR, recognizes that predetermined DRBs are no longer used in LTE and related traffic is to be transmitted/received through WIFI. Also, even when data to be transmitted/received is subsequently no longer generated from the offload DRB, the ENB 410 maintains the DRB without initiating a process for releasing a DRB. This is for reusing the DRB by the UE 405 when the UE 405 subsequently comes back to LTE coverage from LTE/WIFI coverage. Also, the ENB 410 forwards data, of which transmission is not yet initiated among downlink data of the DRB to be offloaded, to a related AP.

When preparation for offload is completed, the UE 405 locally forwards type D data from among uplink data of the offload DRB to a transmission buffer of a WLAN module. Then, the UE 405 maintains the DRB as it is even when the DRB to be offloaded no longer includes data to be transmitted.

Alternatively, it may be considered that the current data of the DRB is processed through the LTE network, and subsequently, only new data is processed through WIFI. In this case, the UE 405 transmits/receives data of the offload EPS bearer to/from the ENB 410 through both WIFI and LTE during a considerable time period after the WIFI load is initiated.

A forwarding operation, an operation of maintaining a DRB, and the like of the UE 405 will be described in more detail below with reference to FIG. 7.

Next, in step 455, the UE 405 transmits/receives data related to the offload DRB by using an accessible AP 450.

The accessible AP 450 (or the accessible WLAN network) signifies an AP (or a WLAN network) that satisfies the conditions below.

[Accessible WLAN Network]
A WLAN signal strength is greater than or equal to a predetermined reference,
A user's subscription allows access to the AP (or an SSID of the WLAN network allows access to the SSID by the UE according to an offload policy).

While the UE 405 transmits/receives data to/from the AP 450, the UE 405 continuously monitors whether an LTE comeback condition is satisfied. The LTE comeback condition may be the elements below.

[LTE Comeback Condition]
Return is achieved when a state, in which WIFI channel quality is lower than or equal to a predetermined reference, continues during a predetermined time period. The reference channel quality and the reference time period may be indicated through the offload command control message indicated by reference numeral 430.

Return is achieved when a state, in which the QoS of WIFI is lower than or equal to a predetermined reference, continues during a predetermined time period. More specifically;

A state, in which capability (throughput) or transmission speed (data rate) is less than or equal to a predetermined reference, continues during a predetermined time period or longer. The throughput may be defined as the amount of data transmitted/received successfully through the WLAN network during a given time period. The transmission throughput (or data rate) of the UE and the reception throughput (or reception speed) thereof may be considered together, or may be independently considered. For example, whether the comeback condition is valid may be determined by comparing the sum of transmission throughput and reception throughput with a reference throughput, by comparing the transmission throughput with another reference throughput, or by comparing the reception throughput with still another reference throughput. The reference throughput and the reference time period may be indicated through the offload command control message indicated by reference numeral 430.

A state, in which a transmission Packet Error Rate (PER) or a transmission Bit Error Rate (BER) is lower than or equal to a predetermined reference, during a predetermined time period or longer. A PER may be defined as a ratio of data, for which a positive acknowledgement is not received among data transmitted through the WLAN network during a predetermined time period, against the data transmitted through the WLAN network. The reference PER/BER and the reference time period may be indicated through the offload command control message indicated by reference numeral 430.

A state, in which a buffering delay is longer than or equal to a predetermined reference, continues during a predetermined time period or longer. A transmission delay signifies a difference between a time point when data arrives at a transmission buffer and a time point when data is transmitted through WIFI. The reference buffering delay and the reference time period may be indicated through the offload command control message indicated by reference numeral 430.

Data transmission/reception does not occur to an offload EPS bearer during a predetermined time period. The offload EPS bearer is an EPS bearer connected to an offload DRB and an offload IP flow. The EPS bearer is a bearer providing particular QoS, and is a superordinate concept of a DRB. When a DRB includes a PDCP entity and an RLC entity on a protocol stack, the EPS bearer connects between a higher layer of the PDCP and an IP flow (or an IP 5-tuple). One EPS bearer is connected to one DRB. The IP 5-tuple is a collective name for a source IP address, a destination IP address, a source port number, a destination port number, and a protocol ID (or an IP flow id, or a QoS id), and is information specifying one IP flow. The reference time period may be indicated through the offload command control message indicated by reference numeral 430.

A need arises to release the offload EPS bearer. For example, when an application connected to an EPS bearer is terminated, the relevant EPS bearer also needs to be released.

When the LTE comeback condition is satisfied, the UE 405 may scan for another accessible WLAN network. When another accessible WLAN network does not exist, the UE 405 releases the WLAN connection, and comes back to the LTE network. When data, that the UE 405 has never transmitted, is stored in a WLAN transmission buffer, the UE 405 locally forwards the data to the offload DRB. The comeback to the LTE network corresponds to a viewpoint from the DRB which has been offloaded. From the standpoint of the UE 405, the UE 405 continuously stays in the LTE network, and thus the expression "comeback" may not be appropriate.

Next, in step 465, the UE 405 checks whether there exists data to be transmitted to the offload DRB. When data has been forwarded from the WLAN transmission buffer to the offload DRB, data to be transmitted exists. In this case, the UE 405 triggers a regular BSR to the ENB 410. When data to be transmitted no longer exists and thus the UE 405 comes back to the LTE network, data to be transmitted to the offload DRB does not exist. In this case, in step 470, in order to prevent the DRB from being unnecessarily maintained, the UE 405 transmits COMEBACK INDICATION, which represents an offload comeback control message, to the ENB 410. The offload comeback control message may include the pieces of information below.

[Offload Comeback Control Message]
  A comeback reason: may represent one of a reason why QoS is lower than or equal to a reference, a reason why channel quality is lower than or equal to a reference, a reason why data to be transmitted no longer exists, and the like.
  A WLAN usage log: an SSID of a WLAN AP, a Base Service Set Identifier (BSSID) thereof, a channel number thereof, and the like. The amount of data transmitted/received through a WLAN. Average transmission/reception throughput in the WLAN, an average transmission delay in the WLAN, an average transmission error rate in the WLAN, and the like.
  An average value (or a representative value) of pieces of WLAN load information, an average value (or a representative value) of channel statuses of the WLAN The ENB, which has received the offload comeback control message, performs a necessary operation (e.g., an operation of releasing the DRB of the UE, etc.), and delivers a WLAN usage log, WLAN load information, and the like to a WLAN management server and a billing server.

Figure 5:
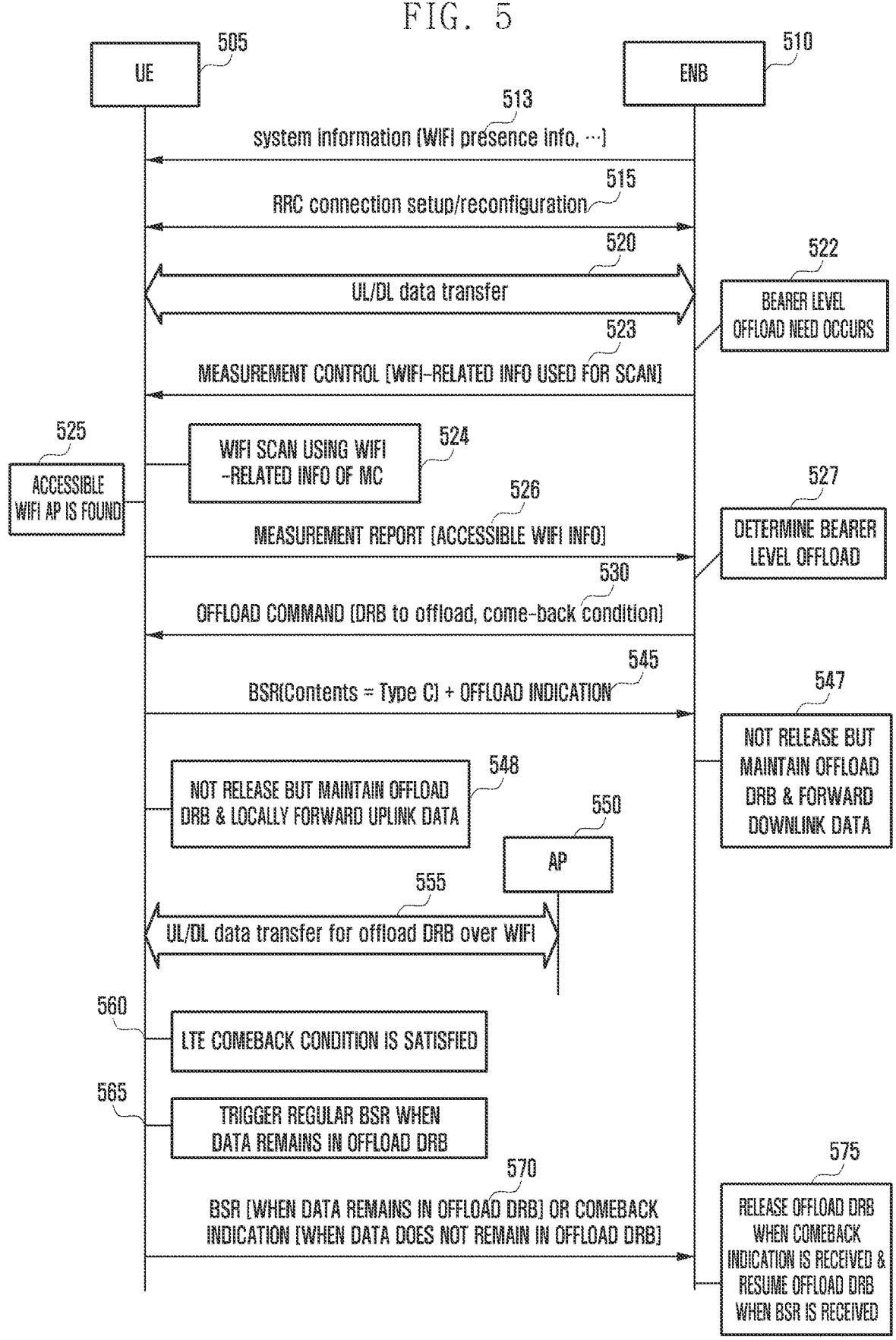
FIG. 5 is a flow diagram illustrating another example of bearer level WIFI offload according to an embodiment of the present invention.

FIG. 5 is a flow diagram illustrating another example of bearer level WIFI offload according to an embodiment of the present invention.

Steps 513, 515 and 520 illustrated in FIG. 5 are identical to steps 415, 420 and 425 illustrated in FIG. 4, respectively.

In step 522, an ENB 510 determines that it is necessary to apply WIFI offload to a UE 505. For example, the determination is made in a case where the conditions below are valid.
  A WIFI network that the UE can access exists around the UE
  It is expected that a large amount of data to be transmitted/received will exist or be generated in a bearer to which offload is to be applied
  There is a need for offload to WIFI when the current load of an LTE network is considered In step 523, the ENB 510 generates a control message (e.g., a control message including measurement control information), which instructs the UE 505 to scan for WIFI, and transmits the generated control message to the UE 505. The measurement control information usually includes Measurement Object representing measurement object information, report configuration representing measurement report configuration information, and the like. Conventional measurement objects are defined as objects in which a cellular network specializes, for example, an LTE frequency, a UMTS frequency and a cell identifier, and the like. In the present invention, WIFI is added thereto as a measurement object. The ENB 510 delivers, to the UE 505, information (e.g., SSID information, WIFI channel information, etc.) for identifying a WIFI network as the measurement object information. The measurement report configuration information is defined in the form of an event. For example, event A1 implies that the channel quality of a serving LTE cell becomes better than a predetermined reference value, whereas event A2 implies that the channel quality of the serving LTE cell becomes worse than the predetermined reference value. In the present invention, a new event is defined in relation to WIFI measurement.
  Event C1: the channel quality of the accessible WIFI network becomes better than the predetermined reference value.
  Event C2: the channel quality of the WIFI network, of which the channel quality has been reported to be better than the predetermined reference value, becomes worse than another predetermined reference value.

The ENB 510 may indicate a cycle, in which WIFI measurement is performed, to the UE 505 through the control message. Also, the ENB 510 may indicate a condition for initiating the WIFI measurement to the UE 505 through the control message. For example, the ENB 510 provides the UE 505 with Radio Frequency (RF) fingerprint representing an RF map corresponding to the location of a WIFI network, or GPS coordinates of a WIFI AP and area information (e.g., radius information of AP coverage) of the AP, and thereby causes the UE 505 to initiate the WIFI measurement only when the UE 505 approaches the WIFI network.

WIFI-related information provided through the measurement control information as described above is referred to as "dedicated WIFI information."

Next, in step 524, the UE 505 scans for whether an accessible WIFI network exists, by using the dedicated WIFI information provided in step 523. When the dedicated WIFI information is not provided or only a part of the dedicated WIFI information is provided, the UE 505 may combine common WIFI information with the dedicated WIFI information, and may use the common WIFI information combined with the dedicated WIFI information.

When the accessible WIFI AP has been found in step 525, in step 526, the UE 505 proceeds to the next step, and generates a measurement report control message and reports the generated measurement report control message to the ENB 510. The measurement report control message may include the pieces of information below.
  An SSID and a BSSID of the found WIFI network (or AP)
  The channel quality of the found WIFI network (or AP)
  Load information recognized from a beacon signal of the AP In step 527, the ENB 510, which has received the control message, determines that the ENB 510 offloads some bearers of the UE 505, and transmits an offload indication message to the UE 505, in step 530.

Subsequent steps 530, 545, 547, 548, 550, 555, 560, 565, 570, and 575 are identical to steps 430, 445, 447, 448, 450, 455, 460, 465, 470, and 475 illustrated in FIG. 4, respectively.

In FIGS. 4 and 5, when a predetermined condition is satisfied, the UE transmits a BSR to the ENB. The BSR is divided into a long BSR and a short BSR. The long BSR reports a buffer status of four Logical Channel Groups (LCGs), and the short BSR reports a buffer status of only one LCG. The LCG is a set of logical channels which are formed as a group by control performed by the ENB, and the logical channels usually have similar logical channel priorities. A buffer status of an LCG is the sum of buffer statuses of logical channels included in the LCG. A logical channel is one-to-one mapped to a radio bearer, and is a path between an RLC entity and a MAC entity. A buffer status of a LCG that the BSR reports is related to the amount of transmissible data stored in logical channels (or radio bearers) belonging to the LCG.

Figure 6:
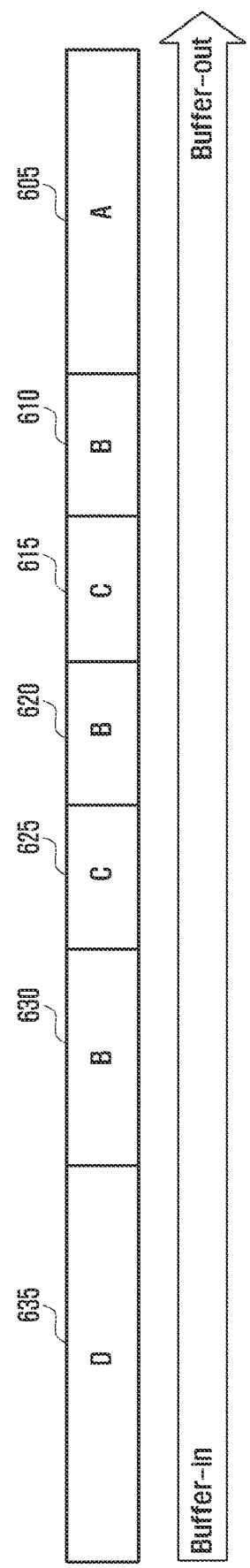
FIG. 6 is a view illustrating the type of data stored in a wireless bearer.

Referring to FIG. 6, data stored in a radio bearer may be largely divided into four types.

Type A data 605: data which has already been transmitted, of which successful reception has been confirmed by a reception side, and for which a discard timer does not expire. The confirmation of successful reception signifies the reception of a positive acknowledgement of the RLC layer. Typically, it is not necessary to store the type A data, but the type A data is not discarded but is stored in view of a need for retransmission and the like in a target cell during a handover in the LTE system. When the discard timer expires, the UE discards the relevant data. The discard timer is a timer that is driven when a PDCP Service Data Unit (SDU) arrives at a PDCP transmission buffer, and is used not to transmit but to discard data which is delayed during an excessively long time period and is not valid.

Type B data 610, 620 and 630: data which has already been transmitted, but of which successful reception has not yet been confirmed by a reception side, and for which a discard timer does not expire. This type of data is data which needs subsequent retransmission thereof, or which needs to be stored until the discard timer expires although the data is not required.

Type C data 615 and 625: data which has already been transmitted, but of which retransmission is requested by a reception side and the retransmission is required, and for which a discard timer does not expire.

Type D data 630: data which has not yet been transmitted, and for which a discard timer does not expire.

For convenience of description, a situation is considered in which WIFI offload is applied to an EPS bearer x, the EPS bearer x is connected to a DRB x', and a certain LCG x" includes only the DRB x'.

At this time, the amount of type C data and that of type D data are reported for the LCG x" by the BSR transmitted before WIFI offload is applied, namely, before step 445 or step 545.

However, only the amount of type C data is reported for the LCG x" by a BSR triggered immediately before the WIFI offload is initiated, or immediately after the WIFI offload is determined to be applied. This is for transmitting type D data through the WIFI network and transmitting type C data through the LTE network after the offload. It may be considered that the type C data is also transmitted/received through the WIFI network. However, in that case, a problem arises in that type B data 620 and 630, which has a buffer arrival time point later than that of type C data, needs to be retransmitted through the WIFI network.

The UE triggers and transmits a BSR in which only the amount of the type C data is reflected, and thereby can prevent the ENB from allocating transmission resources to data which has already been offloaded.

When the UE comes back to LTE from WIFI, the UE delivers data, which is not yet transmitted through the WIFI network, to a transmission buffer of the DRB x'. When new data is generated in the transmission buffer of the DRB x' as a result of the operation, the UE triggers and transmits a BSR to the ENB. At this time, the UE also reflects the amount of type D data in the BSR, and generates the BSR in which the amount of type D data is also reflected.

Figure 7:
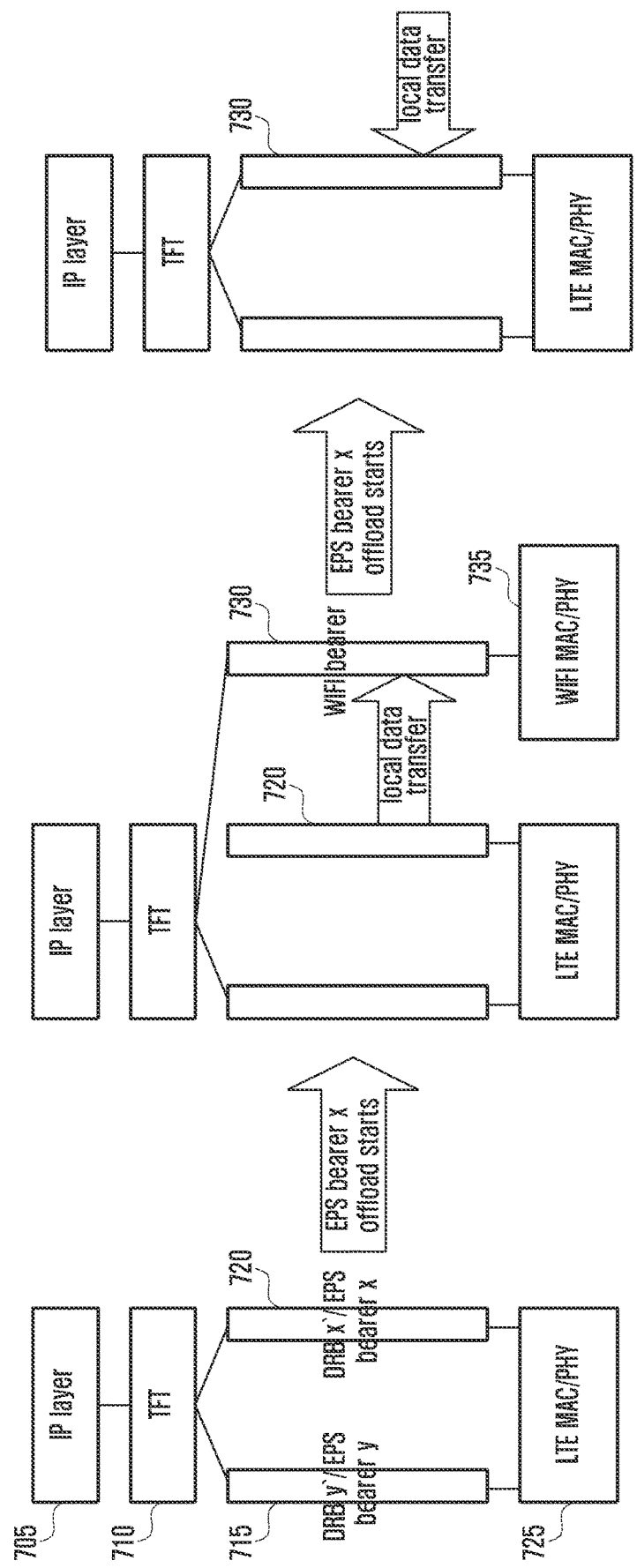
FIG. 7 is a view explaining data delivery in a WLAN offload process.

FIG. 7 is a view explaining data delivery in a WLAN offload process.

When the UE offloads the EPS bearer x to WIFI, the UE may release or maintain a DRB to which the EPS bearer x is mapped. When the UE releases the DRB, if the UE subsequently comes back to the LTE network, the UE needs to newly establish a DRB, and it is desirable to maintain the DRB since the establishment of the new DRB signifies an additional exchange of control messages and a service interruption.

In order to maintain the DRB of the EPS bearer which has already been offloaded to WIFI as described above, the UE needs to request the ENB not to release the DRB although data is not transmitted/received through the relevant DRB. To this end, the UE transmits a predetermined control message to the ENB in step 445 and step 545.

When WIFI offload is initiated, the UE establishes a MAC layer and a physical layer of WIFI. The UE stops an operation of a DRB 720 connected to the EPS bearer to be offloaded, and locally forwards type D data of the DRB to a transmission buffer of a WIFI bearer 730. The UE also reestablishes a Traffic Flow Template (TFT) 710, and thereby does not deliver data of the EPS bearer x to the DRB x' but to WIFI. The TFT is a device that connects an IP flow to an appropriate DRB by using information, such as an IP 5-tuple. The UE establishes the TFT so as to deliver traffic of the offload EPS bearer (or traffic of an offload IP flow) to an appropriate DRB until the WIFI offload is initiated, and adjusts the TFT so as to deliver traffic of the offload EPS bearer to the WIFI bearer when the WIFI offload is initiated. Next, when the WIFI offload is terminated, the UE readjusts the TFT so as to again deliver traffic of the EPS bearer x to the DRB x'. When the WIFI offload is terminated, the UE locally forwards data in the WIFI bearer, which is not yet delivered, to the DRB x'.

Figure 8:
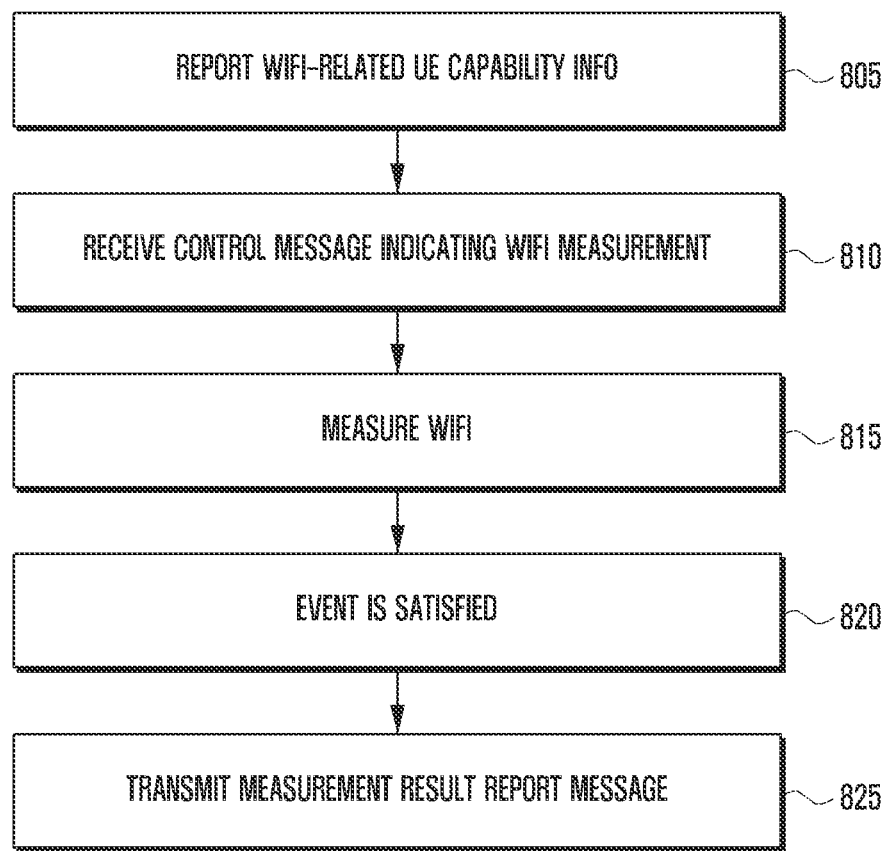
FIG. 8 is a flowchart illustrating a method for measuring a WLAN by a user equipment according to an embodiment of the present invention.

FIG. 8 is a flowchart illustrating a method for measuring a WLAN by a UE according to an embodiment of the present invention.

In step 805, the UE reports WIFI-related capability of the UE to the ENB or the network.

A WIFI UE capability report may be initiated by a request from the ENB. For example, when the UE receives a UE capability enquiry control message indicating a WIFI-related capability report, the UE generates a UE capability information control message including UE information on WIFI offload support, and transmits the UE capability information control message to the ENB.

In step 810, the UE receives a control message indicating WIFI measurement. In the control message, an SSID, channel information, and the like of WIFI are specified as measurement object information, and event C1 or event C2 are specified as measurement report configuration information. The control message may also include information related to a WIFI measurement initiation condition.

In step 815, the UE performs WIFI measurement according to the control message. In performing the WIFI measurement, the UE may consider only dedicated WIFI information, or may consider the dedicated WIFI information and common WIFI information together.

When a predetermined event (e.g., event C1 or event C2) occurs in step 820, the UE proceeds to step 825, and generates a measurement result report message and transmits the measurement result report message to the ENB. The measurement report control message may include an SSID and a BSSID of an accessible WIFI network, of which channel quality is higher than or equal to a predetermined reference, channel quality information of the WIFI network, load information thereof, and the like. The ENB determines whether WIFI offload is performed, by using the measurement result report message. When it is determined that the WIFI offload is performed, the ENB delivers type D data of an offload bearer to a relevant AP. The ENB specifies the AP by using the SSID and the BSSID that the UE has reported.

Figure 9:
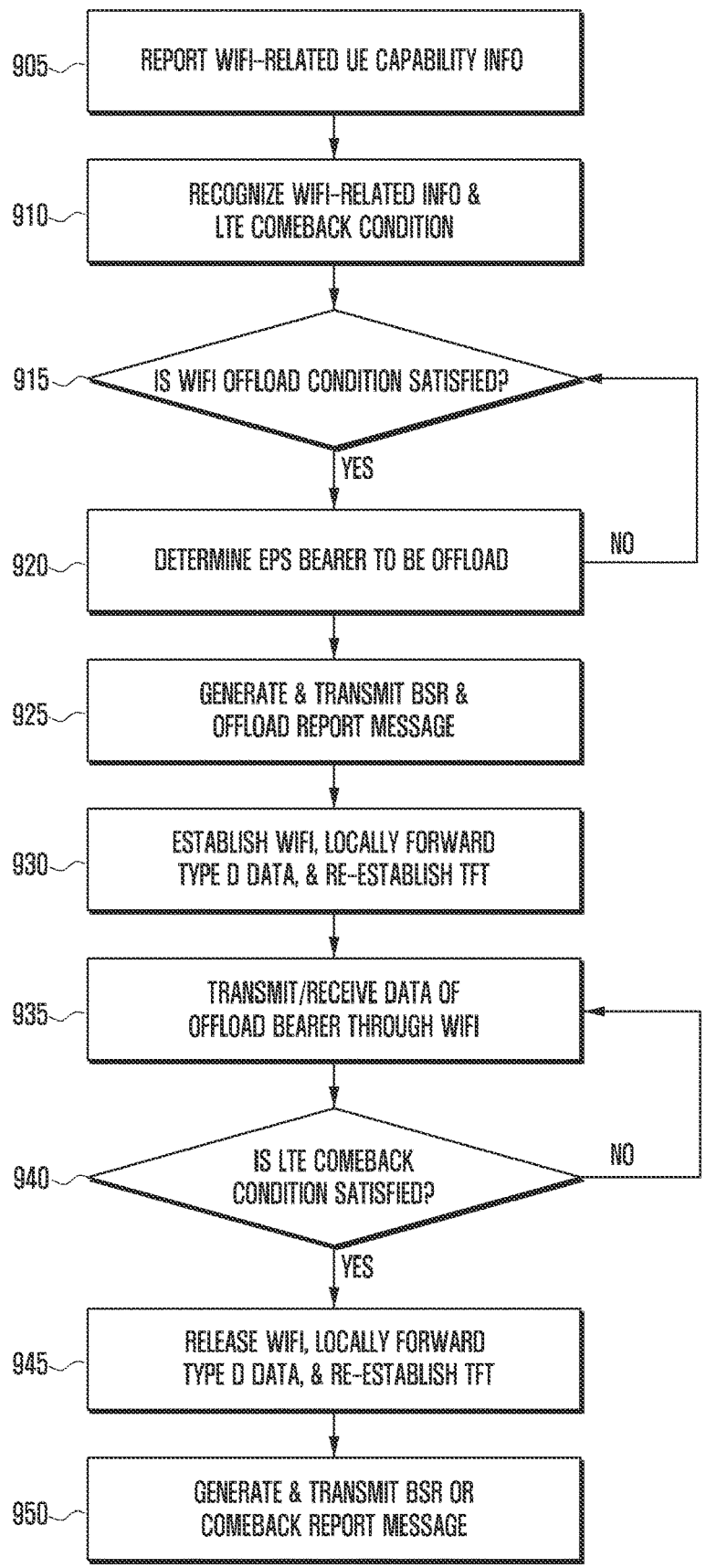
FIG. 9 is a flowchart illustrating a WLAN offload method of a user equipment according to an embodiment of the present invention.

FIG. 9 is a flowchart illustrating a WLAN offload method of a user equipment according to an embodiment of the present invention.

Step 905 is identical to step 805 illustrated in FIG. 8.

In step 910, the UE recognizes WIFI-related information and an LTE comeback condition. The information may be acquired through system information of a serving cell, may be acquired through a unicast RRC control message or a dedicate RRC control message which represents a one-to-one RRC control message, or may be acquired through a combination of the system information and the one-to-one RRC control message.

In step 915, the UE determines whether a WIFI offload condition is satisfied while the UE transmits/receives data in the current serving cell. When the WIFI offload condition is satisfied, the UE proceeds to step 920. The WIFI offload condition is satisfied when the ENB indicates offload to the UE or the UE finds an accessible WIFI network in a state where an offload bearer is established for the UE and the amount of data stored in the offload bearer is larger than or equal to a predetermined reference.

In step 920, the UE determines a bearer to be offloaded. The UE may independently determine the bearer to be offloaded with reference to an offload policy acquired from a WIFI server. Alternatively, the ENB may determine the bearer to be offloaded, and may indicate the determined bearer to the UE.

In step 925, the UE generates an RRC control message, which reports offload, and reports the generated RRC control message to the ENB. When a WIFI offload-related BSR generation condition is satisfied, the UE also generates a BSR, and transmits the BSR and the RRC control message together to the ENB.

In step 930, in order to transmit/receive data through WIFI, the UE appropriately establishes a MAC layer entity and a PHY layer entity of WIFI. Then, the UE locally forwards a predetermined data (e.g., type D data) from among data stored in a transmission buffer of the offload bearer, to a transmission buffer of WIFI. The UE also establishes a TFT in order to change a delivery path of data of the offload bearer from LTE to WIFI. Specifically, the UE establishes the TFT so that the offload bearer may not be delivered to a relevant DRB of LTE but to a related transmission buffer of WIFI.

In step 935, the UE transmits/receives data of the offload bearer through WIFI. At this time, the UE may transmit/receive data through both LTE and WIFI during a predetermined time period (e.g., until the transmission/reception of type C data is completed), and may transmit/receive type C data through LTE and may transmit/receive type D data through WIFI. Alternatively, the UE may transmit/receive both type C data and type D data through LTE, and may transmit/receive only new data through WIFI.

As a method for reducing the complexity of the UE, it may be considered that both type C data and type D data are transmitted/received through WIFI. When the offload is determined, the UE locally forwards, to the transmission buffer of WIFI, the type C data, the type D data, and type B data (e.g., as indicated by reference numerals 620 and 630 in FIG. 6) which lags in time behind the type C data, and discards type A data and type B data (e.g., as indicated by reference numerals 610 in FIG. 6), which precedes the type C data in time, in a transmission buffer. Next, when the transmission of the offload report control message is completed, the UE stops an operation of the offload DRB. The stop of an operation of a certain offload DRB implies that uplink data is not transmitted through the DRB and downlink data of the DRB is quietly discarded in the MAC layer and is not delivered through the relevant DRB even when the downlink data of the DRB is received.

In step 940, the UE checks whether an LTE comeback condition is satisfied. When the LTE comeback condition is satisfied, the UE proceeds to step 945, and releases the MAC entity and the PHY entity of WIFI and locally forwards type D data from among data stored in the transmission buffer of WIFI, to a transmission buffer of the offload DRB. At this time, the UE may deliver the type D data and type C data together. Then, the UE resumes an operation of the offload DRB.

In step 950, the UE generates an offload comeback control message, and transmits the offload comeback control message to the ENB. When a WIFI offload-related BSR generation condition 2 is satisfied, the UE triggers/generates a regular BSR, and transmits the regular BSR to the ENB.

The WIFI offload-related BSR generation condition 2 is as follows.

[WIFI Offload-Related BSR Generation Condition 2]
Comeback to an LTE network from a WLAN network; and
Data is stored in a buffer of an offload DRB.

Hereinafter, as another embodiment of the WLAN offload method according to the present invention, a method and an apparatus are proposed for performing a Discontinuous Reception (DRX) operation in order to reduce the battery consumption of the UE.

Second Embodiment

Figure 10:
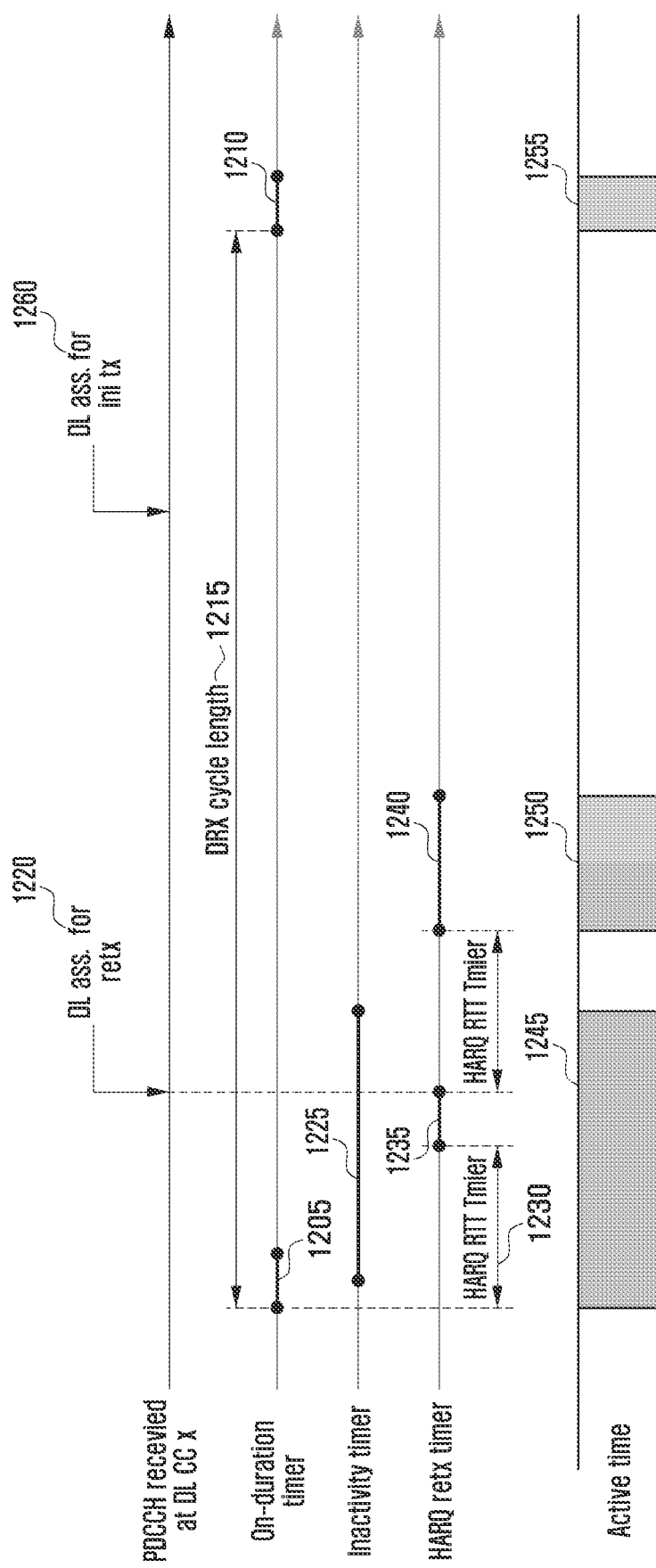
FIG. 10 is a view explaining a discontinuous reception operation of a user equipment.

FIG. 10 is a view explaining a DRX operation of a UE.

The DRX operation corresponds to a scheme in which the UE periodically turns on a receiver at predetermined time points and checks whether a scheduling is performed, thereby minimizing the power consumption of the UE. The operation in which the UE turns on the receiver and checks whether a scheduling is performed is expressed as "the UE is in an active time," and the UE monitors a downlink control channel in the active time. A downlink control channel is referred to as a "Physical Downlink Control CHannel (PDCCH)," through which a downlink scheduling command, which is for allocating a downlink transmission resource and includes other pieces of control information necessary to receive downlink data, or an uplink scheduling command, which is for allocating an uplink transmission resource and includes other pieces of control information necessary to transmit uplink data, is transmitted. In the standards, the downlink scheduling command is referred to as a "downlink assignment" and the uplink scheduling command is referred to as an "uplink grant." Hereinafter, the expression "reception of a downlink scheduling command or an uplink scheduling command by a UE" has an identical meaning to that of the reception of a downlink assignment or an uplink grant by the UE, and is used together with the expression "reception of a PDCCH by the UE."

The downlink scheduling command or the uplink scheduling command is divided into a command for HARQ initial transmission and a command for HARQ retransmission. Hereinafter, a downlink or an uplink scheduling command for HARQ initial transmission is expressed as a downlink or an uplink initial transmission scheduling command, and a downlink or an uplink scheduling command for HARQ retransmission is expressed as a downlink or an uplink retransmission scheduling command.

The DRX operation is specified by defining a time point when the UE shifts to an active time and monitors a PDCCH and a time point when the UE shifts to a non-active time, stops monitoring the PDCCH, and turns off the receiver.

The UE includes an on-duration timer, an inactivity timer, a HARQ retransmission timer, and the like, and operates in an active time when any one of the timers is being driven.

The on-duration timer is driven during a predetermined time interval 1205 or 1210 at every DRX cycle 1215.

The inactivity timer is driven whenever the UE receives a scheduling command indicating an initial transmission. For example, the inactivity timer is driven when the UE receives a downlink scheduling command indicating an initial transmission as indicated by reference numeral 1220 while the on-duration timer is driven. The inactivity timer is not re-driven even when a downlink scheduling command indicating a retransmission is received while the inactivity timer is driven.

Since a downlink data reception and an uplink data transmission are performed according to an HARQ scheme, the UE needs to receive a scheduling command for HARQ retransmission when an error remains in the data after the UE receives initial HARQ transmission or receives HARQ retransmission. To this end, the HARQ retransmission timer is defined in the UE. Whenever receiving downlink data, the HARQ retransmission timer is driven after the passage of a predefined time period 1230 and 1235 at a time point when the downlink data is received. The predefined time period is defined by a timer which is called a HARQ Round Trip Time (RTT) timer and has a predetermined length. When receiving a scheduling command indicating a retransmission as indicated by reference numeral 1260, the HARQ retransmission timer is stopped.

Hereinafter, a problem will be described which arises due to an early stop of the HARQ retransmission timer during the DRX operation of the UE.

Figure 11:
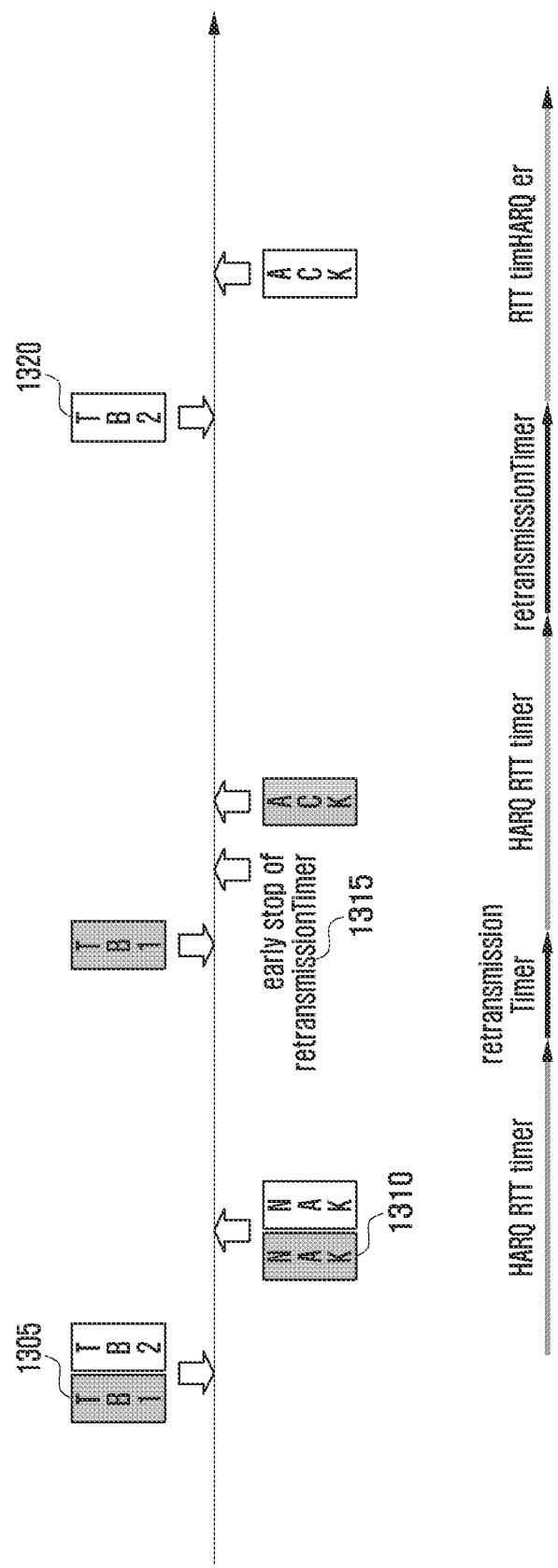
FIG. 11 is a view explaining a problem caused by an early stop of a HARQ retransmission timer.

FIG. 11 is a view explaining a problem caused by an early stop of the HARQ retransmission timer.

It is problematic that one HARQ retransmission timer is included per HARQ process and thus the HARQ retransmission timer inefficiently operates in a Multiple-Input Multiple-Output (MIMO) in which two Transport Blocks (TBs) are transmitted through one transmission wherein a TB is obtained by appending a Cyclic Redundancy Check (CRC) to a MAC PDU.

For example, TB1 and TB2 are transmitted/received in a certain HARQ process at a certain time point as indicated by reference numeral 1305. When the two TBs both fail to be transmitted, the UE transmits a Negative Acknowledgement (NAK) for each of TB1 and TB2 as indicated by reference numeral 1310.

When the HARQ retransmission timer is driven at a certain time point and the UE receives one of the two TBs, the UE stops driving the retransmission timer as indicated by reference numeral 1315. At this time, the retransmission of the remaining TB is delayed until the HARQ retransmission timer is re-driven as indicated by reference numeral 1320.

Hereinafter, an operation of the UE for solving the above-described problems according to an embodiment of the present invention will be described.

Figure 12:
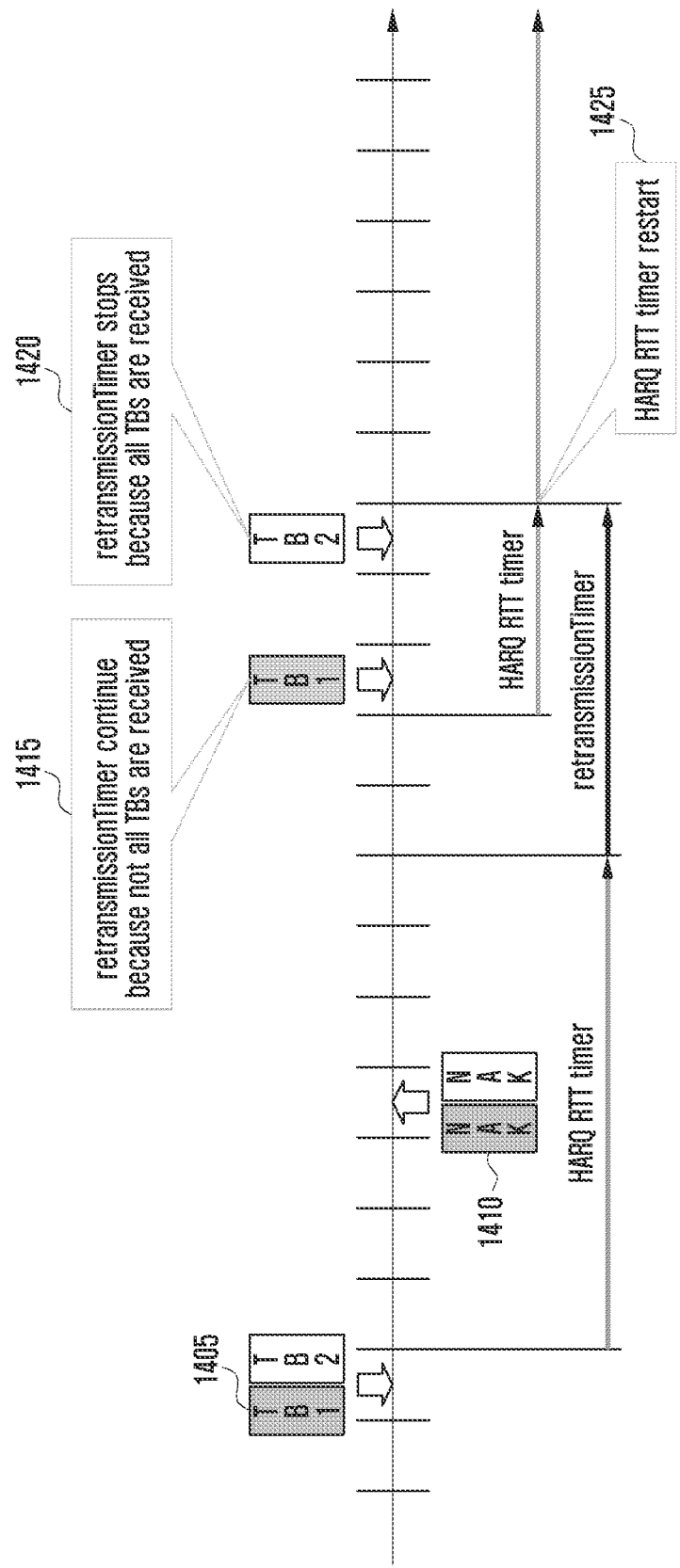
FIG. 12 is a view explaining an operation for controlling a HARQ retransmission timer according to an embodiment of the present invention.

FIG. 12 is a view explaining an operation for controlling a HARQ retransmission timer according to an embodiment of the present invention.

In order to solve the above-described problems, in an embodiment of the present invention, when the MIMO is driven, the HARQ retransmission timer is stopped after all TBs, which are not yet successfully received among TBs of a relevant HARQ process, are received.

For example, referring to FIG. 12, when TB1 and TB2 are simultaneously transmitted/received in a certain HARQ processor at a certain time point as indicated by reference numeral 1405 and the two TBs both fail to be transmitted, the UE transmits a NAK for each TB as indicated by reference numeral 1410. Both TB1 and TB2 are stored in a buffer of the HARQ process.

In step 1415, although the retransmission of TB1 is received, since the retransmission of TB2 is not yet received, namely, since another TB necessary to be retransmitted is stored in the relevant HARQ process, the UE does not stop the HARQ retransmission timer. At this time, the HARQ RTT timer is normally driven.

In step 1420, when the retransmission of TB2 is received, retransmissions of TBs necessary to be retransmitted are all received while the HARQ retransmission timer is driven, and thus the UE stops the HARQ retransmission timer. At this time, the UE re-drives the HARQ RTT timer, which is already being driven, as indicated by reference numeral 1425. This is for preventing the HARQ RTT timer from expiring when the HARQ retransmission timer is being driven. This is because when the above-described situation occurs, the UE cannot determine whether the UE needs to re-drive the HARQ retransmission timer or needs to maintain the HARQ retransmission timer as it is.

Hereinafter, the operation of the UE for controlling the HARQ retransmission timer, which has been described in detail, will be described in more detail.

Figure 13:
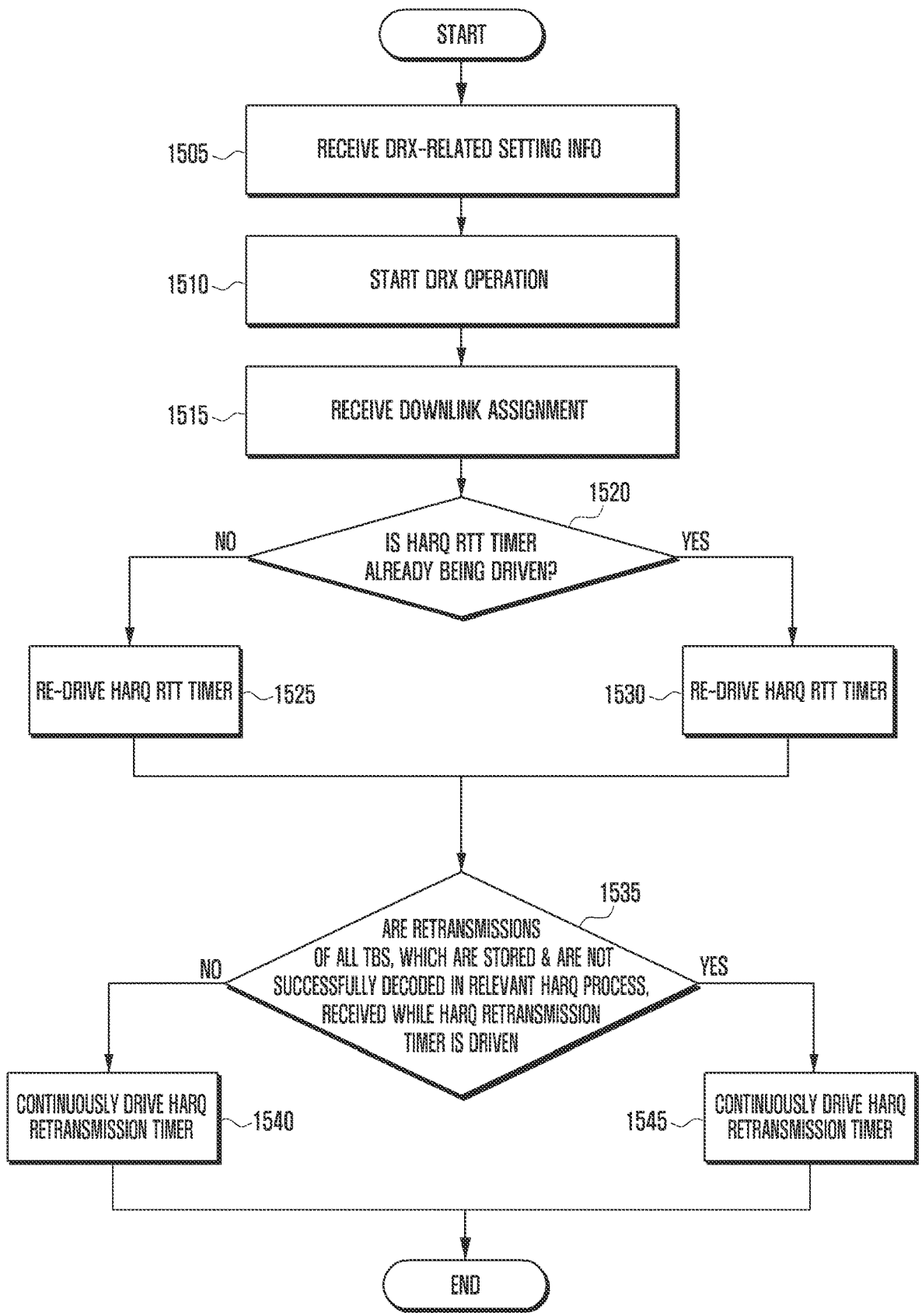
FIG. 13 is a flowchart illustrating an operation of a user equipment according to an embodiment of the present invention.

FIG. 13 is a flowchart illustrating an operation of a UE according to an embodiment of the present invention.

In step 1505, the UE acquires DRX setting information. The DRX setting information may be received through a control message, such as a RRC connection reconfiguration. Also, the DRX setting information may include information on an onDurationTimer, a drx-InactivityTimer, a HARQ retransmission timer, a DRX cycle length, a drxStartOffset, and the like. In step 1510, the UE starts a DRX operation. Specifically, the UE specifies a start subframe of the onDurationTimer by applying the DRX cycle length and the drxStartOffset to Equation 1 below.

$$[(SFN \times 10) + \text{subframe number}] \, \text{modulo} \, (DRX\text{-}Cycle) = (drxStartOffset) \, \text{modulo} \, (DRX\text{-}Cycle) \quad \text{Equation 1}$$

In Equation 1, a System Frame Number (SFN) is an integer between 0 and 1023, and is increased by 1 at every time interval of 10 ms.

Also, the UE maintains an active time while the onDurationTimer is at least driven, from the subframe. When a downlink assignment or an uplink grant indicating a new transmission is received during the time period, the active time is extended by the drx-InactivityTimer.

When receiving a downlink assignment for a certain HARQ process in step 1515, the UE proceeds to step 1520, and checks whether a HARQ RTT timer of the HARQ process is already being driven.

When the HARQ RTT timer of the HARQ process is already being driven, the UE proceeds to step 1530, and re-drives the HARQ RTT timer in such a manner as to apply an initial value of the HARQ RTT timer. When the HARQ RTT timer of the HARQ process is not being driven, the UE proceeds to step 1525, and drives the HARQ RTT timer.

When a HARQ retransmission timer of the relevant HARQ process is being driven, the UE proceeds to step 1535, and determines whether the HARQ retransmission timer is stopped.

When the HARQ retransmission timer is not being driven, the UE stands by until a new downlink assignment is received, and returns to step 1515.

In step 1535, the UE checks whether all TBs, which are stored in the relevant HARQ process, namely, are not yet successfully decoded in the relevant HARQ process, are received while the timer is driven. When all of the TBs, which are stored in the relevant HARQ process, namely, are not yet successfully decoded in the relevant HARQ process, are received while the timer is driven, the UE proceeds to step 1545, and stops the HARQ retransmission timer. In contrast, when any of the TBs, which are stored in the relevant HARQ process, namely, are not yet successfully decoded in the relevant HARQ process, is not received while the timer is driven, the UE proceeds to step 1540, and does not stop the HARQ retransmission timer but continuously drives the HARQ retransmission timer.

The condition of step 1535 may be changed as described below.

When all of the TBs, which have not yet been successfully decoded when the timer is started, are received while the timer is driven, the UE proceeds to step 1545. When a TB from among the TBs, which have not yet been successfully decoded when the timer is started, is not received while the timer is driven, the UE proceeds to step 1540.

Third Embodiment

A Carrier Aggregation (CA) technique, in which multiple serving cells are aggregated for one UE in order to increase the transmission speed (data rate) of a UE, has been introduced.

Figure 16:
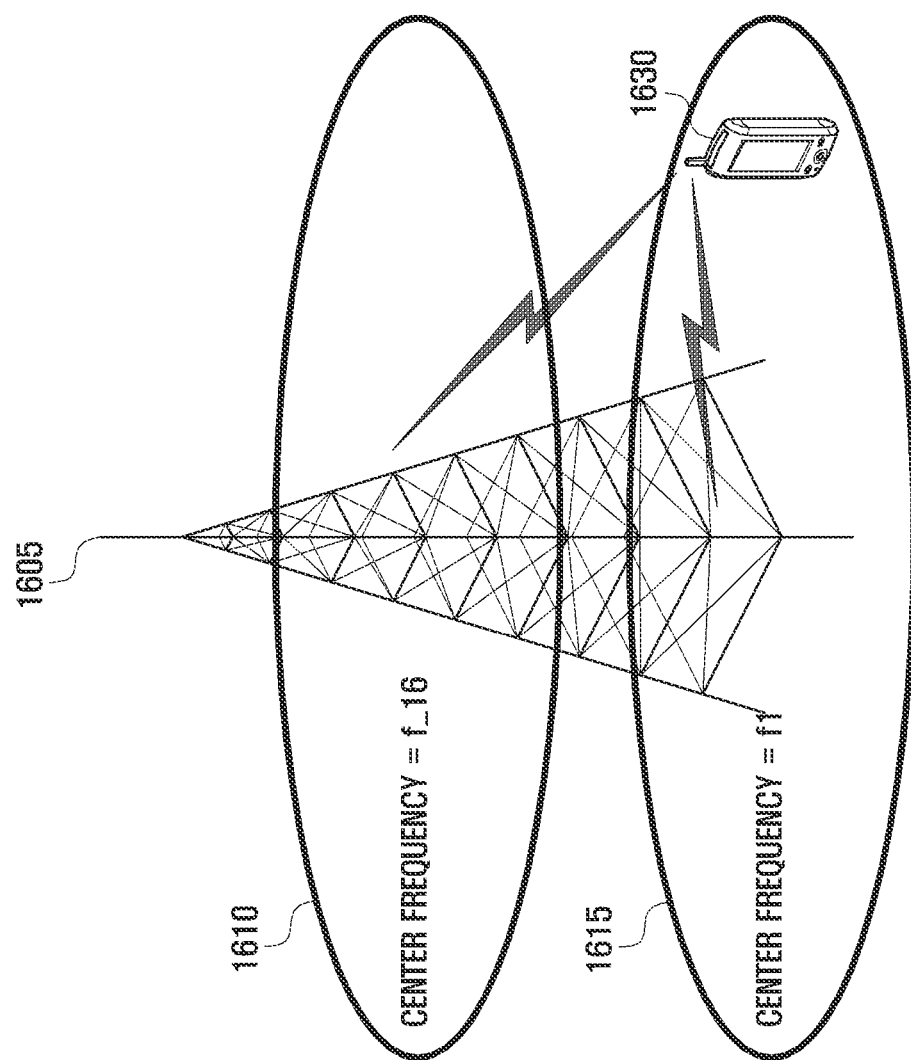
FIG. 16 is a view explaining carrier aggregation.

FIG. 16 is a view explaining CA.

Referring to FIG. 16, one ENB typically transmits and receives multiple carriers in different frequency bands. For example, when an ENB 1605 transmits a carrier 1615 having a downlink center frequency f1 and a carrier having a downlink center frequency f3 1610, one UE transmits/receives data through one of the two carriers according to the related art. However, a UE 1630 having carrier aggregation capability may transmit/receive data by simultaneously using multiple carriers. The ENB 1605 may allocate more carriers to the UE 1630, which has carrier aggregation capability, according to the situation, and thereby may increase the transmission speed of the UE 1630. The aggregation of downlink carriers and uplink carriers, that one ENB transmits and receives as described above, is referred to as "CA."

Terms to be frequently used in embodiments of the present invention will be described below.

When one cell includes one downlink carrier and one uplink carrier transmitted and received by one ENB in the conventional sense, the CA can be understood as a simultaneous transmission and reception of data through multiple cells by a UE. Through the CA, the maximum transmission speed increases in proportion to the number of aggregated carriers.

Hereinafter, in describing embodiments of the present invention, the reception of data through a certain downlink carrier or the transmission of data through a certain uplink carrier by a UE refers to the transmission/reception of data by the UE through a control channel and a data channel which are provided by a cell corresponding to a central frequency and a frequency band characterizing the carriers. In the present invention, particularly, the aggregation of carriers will be expressed as "setting of multiple serving cells," and use is made of terms, such as a primary serving cell (hereinafter a "PCell"), a secondary serving cell (hereinafter an "SCell"), an activated serving cell, and the like. The terms have meanings used in an LTE mobile communication system as they are, and details of the terms can be found in TS 36.331, TS 36.321, and the like. In the present invention, also, use is made of terms, such as timeAlignmentTimer, Activation/Deactivation MAC Control Element (CE), C-RNTI MAC CE, and the like, and a more detailed description of the terms can be found in TS 36.321.

When an SCell is set or activated for the UE or the SCell is released or deactivated, the UE may reconfigure a radio frequency frontend. This includes a procedure of reconfiguring an RF filter bandwidth according to a situation in which the SCell is set or activated newly or released or deactivated, and the transmission/reception of data is stopped while the UE reconfigures the RF filter bandwidth. The RF bandwidth reconfiguration is characterized as follows.

When an SCell having a frequency band identical to that of a PCell is set, activated, released, or deactivated, the transmission/reception of data is stopped through the PCell during a predetermined time period, and the stop of the transmission/reception of data is expressed as "PCell interruption."

Whether PCell interruption has occurred and the length of a period of the PCell interruption may be changed according to the processing capability of the UE and hardware performance.

When the PCell and the SCell are set in different frequency bands, ### the RF bandwidth reconfiguration is not required, and the PCell interruption does not occur.

When the PCell and the SCell are set in an identical frequency band, if the UE includes one or more RF apparatuses, and if the one or more RF apparatuses are used in the frequency band, the RF bandwidth reconfiguration is not required, and the PCell interruption does not occur.

When the PCell and the SCell are set in the identical frequency band, and if only one RF apparatus is used in the frequency band, the RF bandwidth reconfiguration is required, and the PCell interruption occurs.

When the SCell is activated or deactivated, when the measurement of the SCell needs to be performed, when the SCell is activated or deactivated during the execution of the RF bandwidth reconfiguration, and before and after the UE performs the measurement of the SCell in an inactive state, the PCell interruption occurs. When the RF apparatus is reconfigured to include both the PCell and SCell in setting the SCell and when the RF apparatus is reconfigured to include only the PCell in releasing the SCell, the PCell interruption does not occur while the SCell is set.

The present invention proposes a method and an apparatus in which the UE reports to the ENB whether the PCell interruption is required and the ENB schedules the UE in view of whether the PCell interruption has occurred, a time point of the occurrence of the PCell interruption, and the like.

Figure 17:
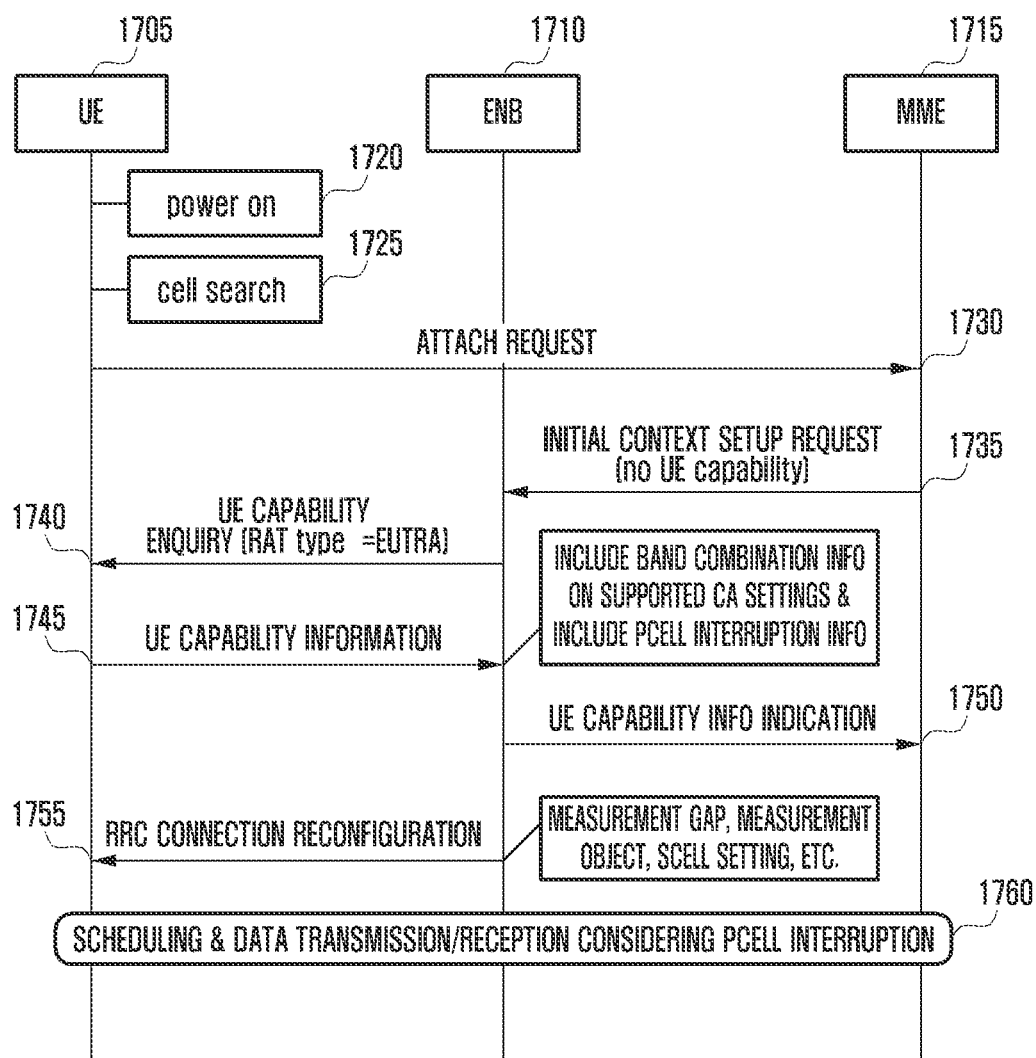
FIG. 17 is a flowchart illustrating a method for scheduling a user equipment based on PCell interruption according to an embodiment of the present invention.

FIG. 17 is a flowchart illustrating a method for scheduling a user equipment based on PCell interruption according to an embodiment of the present invention.

Referring to FIG. 17, in a mobile communication system including a UE 1705, an ENB 1710, and an MME 1715, the UE 1705 is powered in step 1720. In step 1725, the UE 1705 searches for a cell, of which a radio signal is received, and a corresponding PLMN through a cell search process and the like, and determines a cell of a PLMN, through which the UE 1705 is to perform a registration process, on the basis of a result of the search.

In step 1730, the UE 1705 performs an RRC connection setup process through the selected cell, and then transmits, to the MME 1715, ATTACH REQUEST representing a control message requesting for registration. This message includes information, such as identifier of the UE 1705.

Upon receipt of the ATTACH REQUEST message, the MME 1715 determines whether to accept the registration of the UE 1705 and, when it is determined to accept the registration of the UE 1705, transmits Initial Context Setup Request representing a control message to the serving ENB 1710 of the UE 1705, in step 1735. When the MME 1715 has capability information of the UE 1705, the MME 1715 includes the capability-related information of the UE 1705 in the control message, and transmits the control message including the capability-related information of the UE 1705; however, the MME 1715 does not have the capability information of the UE 1705 in the initial registration process, and thus the control message does not include the capability-related information of the UE 1705.

When the ENB 1710 receives the Initial Context Setup Request message which does not include the capability information of the UE 1705, the ENB 1710 transmits, to the UE 1705, a control message called UE CAPABILITY ENQUIRY, in step 1740. This message instructs the UE 1705 to report the capability, and requires capability information on particular Radio Access Technology (RAT) of the UE 1705 by using a parameter called RAT type. When the UE 1705 is performing the process in the LTE network, the RAT type is set to Evolved Universal Terrestrial Radio Access (EUTRA). When there is another wireless network (e.g., a UMTS network) around the ENB 1710, the ENB 1710 may require the UMTS-related capability information of the UE 1705 by adding UTRA to the RAT type in preparation for a subsequent handover and the like.

When receiving the UE CAPABILITY ENQUIRY control message, the UE 1705 generates UE CAPABILITY INFORMATION including its capability information on the wireless technology indicated by the RAT type. This control message includes one or more pieces of band combination information for each band combination that the UE 1705 supports. The band combination information indicates a CA combination supported by the UE 1705, and the ENB 1710 sets appropriate CA for the UE 1705 by using the band combination information. The control message also includes the information (PCell interruption information) indicating whether the UE 1705 needs the PCell interruption for a predetermined band combination. The UE 1705 transmits a UE CAPABILITY INFORMATION message to the ENB 1710 in step 1745.

The ENB 1710 transmits a UE CAPABILITY INFO INDICATION message to the MME 1715 in order to report the capability information of the UE 1705 included in the UE CAPABILITY INFORMATION message to the MME 1715, in step 1750. The ENB 1710 also appropriately reconfigures the UE 1705 with reference to a traffic status, a channel status, and the like of the UE 1705 on the basis of the capability information reported by the UE 1705. For example, the ENB 1710 sets an additional SCell for the UE 1705 or configures a measurement gap in such a manner as to instruct the UE 1705 to measure another frequency, in step 1755.

The ENB 1710 performs scheduling of the PCell in view of the PCell interruption, and the UE 1705 performs RF bandwidth reconfiguration so as to cause PCell interruption to occur during a predetermined time period, in step 1760.

Figure 18:
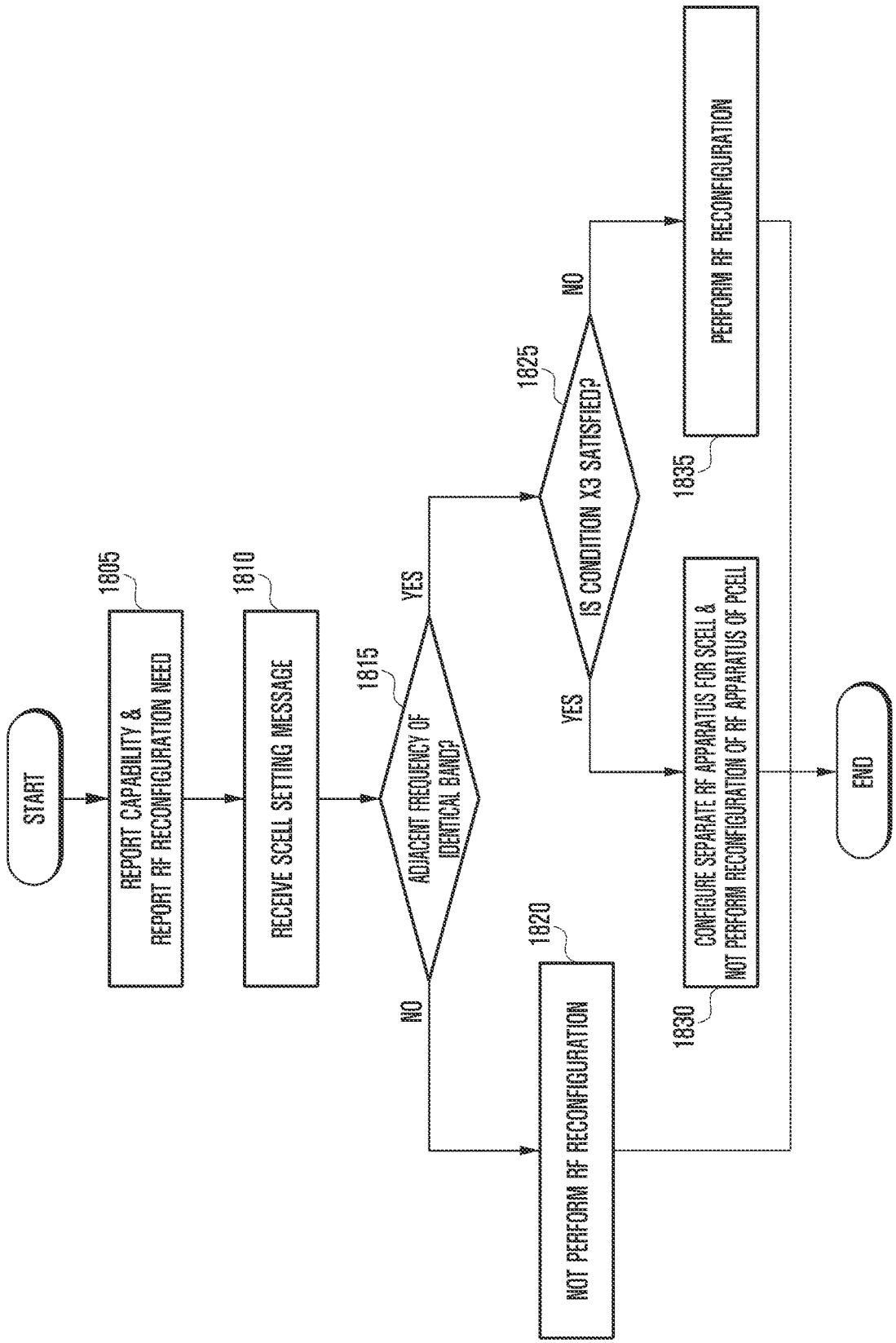
FIG. 18 is a flowchart illustrating a first embodiment of an operation of a user equipment in a method for scheduling the user equipment based on PCell interruption according to an embodiment of the present invention.

FIG. 18 is a flowchart illustrating a first embodiment of an operation of a user equipment in a method for scheduling the user equipment based on PCell interruption according to an embodiment of the present invention.

Referring to FIG. 18, in step 1805, the UE reports its capability to the ENB. At this time, the UE reports frequency bands, that the UE supports, and a frequency band combination supporting carrier aggregation. When the frequency band combination is an intra-band combination, the UE reports a need for RF bandwidth reconfiguration.

Figure 19:
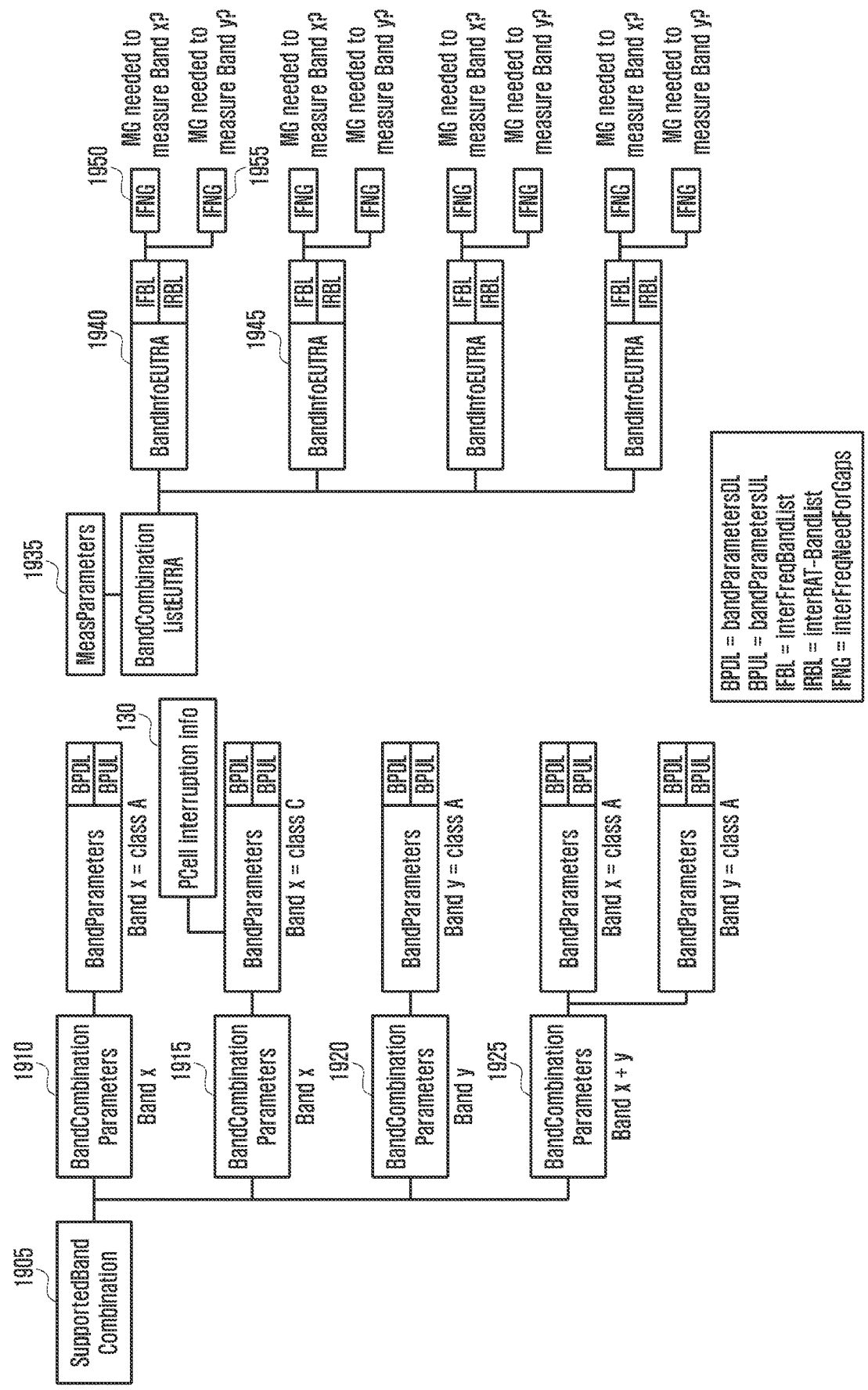
FIG. 19 is a view illustrating information on a band combination and a measurement capability parameter which are included in capability information of a user equipment.

FIG. 19 illustrates information on a band combination and a measurement capability parameter which are included in capability information of a UE.

Hereinafter, a case is considered in which the UE supports a frequency band x and a frequency band y and supports CA as described below. Table 1 below shows a frequency band and the number of serving cells for each frequency band combination.

TABLE 1

| | Band combination |
|---|---|
| Frequency band combination 1 1910 | One serving cell in band x |
| Frequency band combination 2 1915 | Two serving cells in band x |
| Frequency band combination 3 1920 | One serving cell in band y |
| Frequency band combination 4 1925 | One serving cell in band x and One serving cell in band y |

The UE capability report message includes 1-bit information, which indicates whether the PCell interruption has occurred, in frequency band combination information satisfying the condition below.

A band combination in which at least two serving cells are set in one band.

According to the above-described embodiment of the present invention, two serving cells are set for the UE in the band x of the frequency band combination 2 1915, and thus the UE includes PCell interruption information 1930 in the capability information. When the UE applies one or more RF apparatuses to the band x, the UE sets the PCell interruption information to "no." In contrast, when the UE applies only one RF apparatus to the band x, the UE sets the PCell interruption information to "yes." In an embodiment of the present invention, the UE may report whether the PCell interruption is required, by using other pieces of information, which already exist, instead of explicitly including the PCell interruption information. For example, if the UE sets an interFreqNeedForGaps bit, which satisfies a predetermined condition, to "no," it implies that the PCell interruption does not occur in a predetermined band.

As described above, the capability information of the UE includes SupportedBandCombination (hereinafter "SBC") 1905, which represents information on a band combination supported by the UE, and MeasParameters 1935 representing a measurement capability parameter of the UE.

The SBC 1905 includes BandCombinationParameters (hereinafter "BCP") 1910, 1915, 1920 and 1925 representing one or more band combination parameters. The BCP 1910, 1915, 1920 and 1925 is information on the respective band combinations supported by the UE.

The BCP 1910, 1915, 1920 and 1925 includes BandParameters (hereinafter "BP") representing one or more band parameters. A BP includes FreqBandIndicator representing information indicating a band, bandParametersDL (hereinafter "BPDL") representing a downlink band parameter, and bandParametersUL (hereinafter "BPUL") representing an uplink band parameter. A BPDL again includes bandwidthClass representing a bandwidth class indicating the number of serving cells supported by a relevant band, and antenna capability information. Bandwidth class A represents capability which corresponds to an entire bandwidth going up to a maximum of 20 MHz and can be used to set one serving cell. Bandwidth class B represents capability which can be used to set two serving cells and corresponds to an entire bandwidth going up to a maximum of 20 MHz. Bandwidth class C represents capability which can be used to set two serving cells and corresponds to an entire bandwidth going up to a maximum of 40 MHz.

Measurement capability information of the UE includes BandInfoEUTRA (hereinafter "BI") 1940 and 1950 representing pieces of band information, the number of which is identical to that of BCP 1910, 1915, 1920 and 1925. One BI 1940 and 1950 one-to-one corresponds to one BCP 1910, 1915, 1920, and 1925 in order of including the relevant pieces of information. Specifically, the first BI 1940 corresponds to the first BCP 1910, and the second BI 1945 corresponds to the second BCP 1915. The BI 1940 and 1950 includes interFreqBAndList (hereinafter "IFBL"), which is information indicating whether a measurement gap is required during inter-frequency measurement for EUTRA frequency bands, and interRAT-BandList which is information indicating whether a measurement gap is required during the measurement of frequency bands of different RATs, such as UTRA.

The IFBL includes interFreqNeedForGaps (hereinafter "IFNG") 1950 and 1955 representing as many measurement gap need indicators as the number of EUTRA frequency bands supported by the UE. The IFNG 1950 and 1955 indicates whether a measurement gap is required in order for EUTRA frequency bands included in bandListEUTRA representing an EUTRA frequency band list supported by the IFNG 1950 and 1955. For example, when the UE has included a band X and a band Y in the bandListEUTRA, the first IFNG 1950 indicates a need for a measurement gap for the band X, and the second IFNG 1955 indicates a need for a measurement gap for the band Y. Specifically, when the first IFNG 1950 is set for the related BCP 1910, the first IFNG 1950 indicates whether a measurement gap is required in performing, by the UE, inter-frequency measurement for the band X. The second IFNG 1955 indicates whether a measurement gap is required in performing inter-frequency measurement for the band Y.

Hereinafter, a description will be made of a method in which the UE implicitly reports PCell interruption information on the predetermined BCP 1910, 1915, 1920 and 1925.

When the UE is set to use one or more RF apparatuses in a predetermined frequency band, the UE reports that PCell interruption is not required for the frequency band. At this time, the UE reports that the PCell interruption is not required by setting an IFNG, which corresponds to the frequency band among IFNGs of a BI corresponding to a BCP (BCP which is not CA) in which only one serving cell is set for the frequency band, not to need a measurement gap. For example, when an SCell of the same frequency band as a frequency band x is set, released, activated, deactivated, or measured for the UE for which a PCell is set in the frequency band x, the UE represents that the PCell interruption is not required, by determining that the IFNG 1950 for the frequency band x is "no" at the BI 1940 corresponding to the BCP 1910, in which only one serving cell is being set in the frequency band x, in order to represent that the PCell interruption does not occur.

In other words, when the SCell is set, released, activated, deactivated, or measured in the frequency band in which the PCell is set, if the UE reports its capability as in Table 2 below, the UE uses a separate RF apparatus in the PCell and the SCell, and the PCell interruption does not occur.

TABLE 2

When only one serving cell is set for the UE and the serving cell is set in the frequency band, a measurement gap is not required in performing inter-frequency measurement for the frequency band.

In step 1810, the UE receives a control message which sets at least one SCell. In step 1815, the UE checks whether a frequency band of the SCell belongs to and is adjacent to a frequency band identical to that of the serving cell (e.g., a PCell), which is already set.

When the condition is not satisfied, the UE proceeds to step 1820, and does not perform RF bandwidth reconfiguration but determines that the PCell interruption is not allowed and performs an operation. An operation of the UE in a case where it is determined that the PCell interruption is not allowed is described in Table 3 below, and an operation of the UE in a case where it is determined that the PCell interruption is allowed is described in Table 4 below.

TABLE 3

The ENB may schedule the transmission/reception of data for the UE during a time period which may be specified by the PCell interruption and, since the ENB expects the UE to perform uplink transmission, the UE monitors a PDCCH during the time period, and performs the scheduled uplink transmission.

TABLE 4

The ENB may not schedule the transmission/reception of data for the UE during a time period which may be specified by the PCell interruption and, since the ENB expects the UE not to perform uplink transmission, the UE performs RF bandwidth reconfiguration during the time period which may be specified by the PCell interruption. After completing the RF bandwidth reconfiguration, the UE resumes PDCCH monitoring and the execution of scheduled uplink transmission.

The time period which may be specified by the PCell interruption is, for example, a time period between n+m1 and n+m1+k1 when a time point of receiving a control message, which sets an SCell, is a subframe n. k1 needs to be defined so that all types of UEs may reconfigure a radio frequency frontend, and may be equal to, for example, 5. m1 needs to be defined so that all types of UEs may receive and interpret the control message and may recognize the fact that it is necessary to reconfigure the radio frequency frontend, and may be equal to, for example, 20.

When a newly-set SCell is set in a frequency band identical to that of the PCell and frequency bands of the two serving cells are adjacent to each other, the UE proceeds to step 1825, and checks whether the condition shown in Table 5 below is satisfied.

TABLE 5

When only one serving cell is set in a frequency band in which the PCell and the SCell are set, it is reported that a measurement gap is not required to perform inter-frequency measurement for the identical frequency band. Alternatively, it is reported that a measurement gap is not required, when inter-frequency measurement is performed for an adjacent cell of the frequency band in BandInfoEUTRA corresponding to the setting of non-CA for the frequency band in which the PCell and the SCell are set.

When the condition shown in Table 5 is satisfied, the UE proceeds to step 1830. When the condition shown in Table 5 is not satisfied, the UE proceeds to step 1835. Proceeding to step 1830 signifies that the ENB determines that the PCell interruption does not occur, and the UE causes an RF apparatus of the PCell not to be reconfigured by configuring a separate RF apparatus for the SCell. Then, the UE performs the operation shown in Table 3.

Proceeding to step 1835 signifies that the ENB determines that the PCell interruption occurs, and the UE reconfigures an RF bandwidth during a predetermined time period, and causes the PCell interruption to occur within the predetermined time period.

Figure 20:
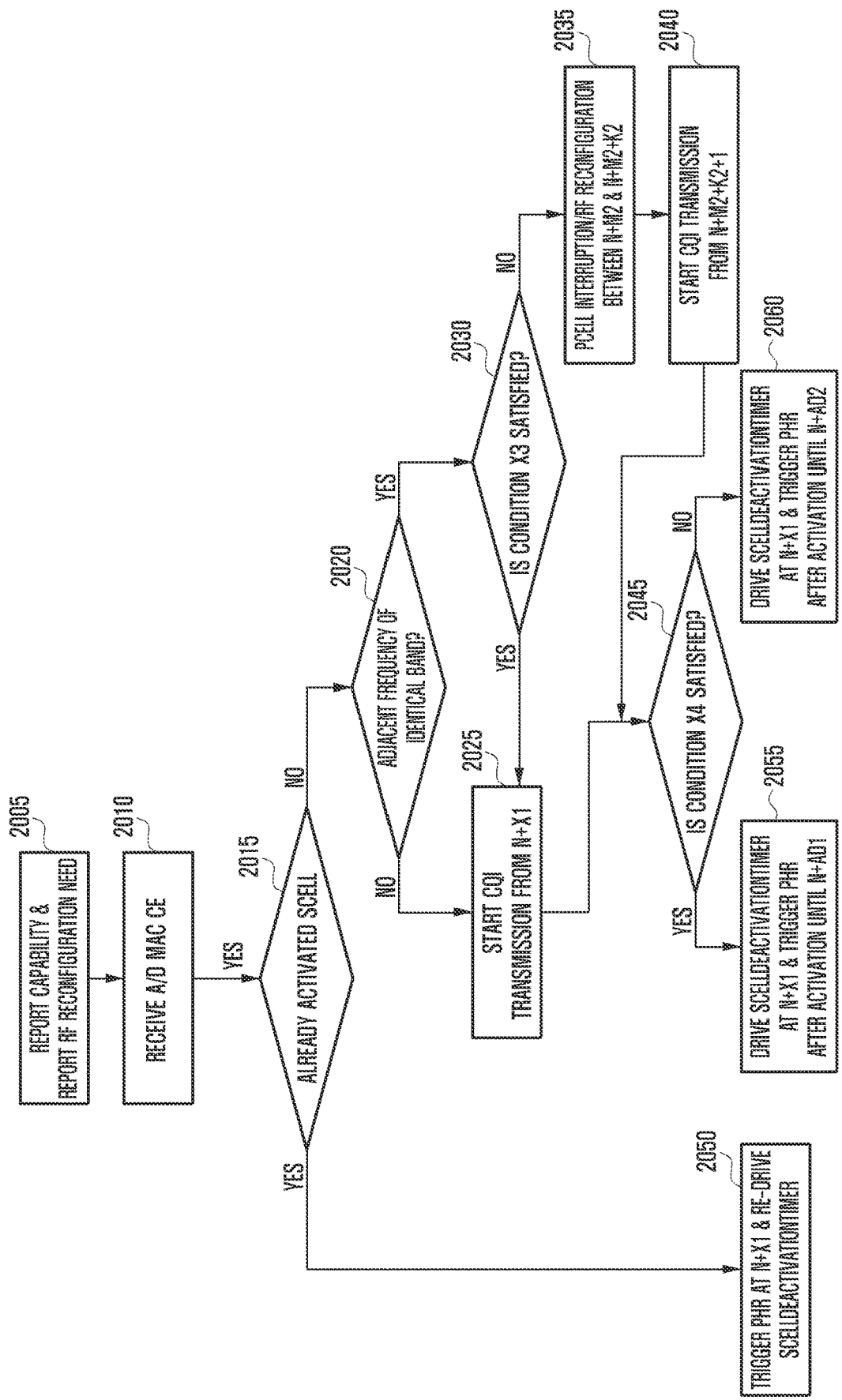
FIG. 20 is a flowchart illustrating a second embodiment of an operation of a user equipment in a method for scheduling the user equipment based on a PCell interruption according to an embodiment of the present invention.

FIG. 20 is a flowchart illustrating a second embodiment of an operation of a UE in a method for scheduling the user equipment based on a PCell interruption according to an embodiment of the present invention.

Details of step 2005 illustrated in FIG. 20 are the same as described in step 1805 illustrated in FIG. 18.

In step 2010, the UE receives an Activation/Deactivation MAC CE (hereinafter "A/D MAC CE") in which a bit for at least one SCell is set to 1.

The A/D MAC CE is a MAC layer control message activating or deactivating SCells which are set for the UE, and includes a MAC sub-header and a payload.

The MAC sub-header includes a Logical Channel ID (LCID) representing the type of a payload, an E bit representing whether another MAC sub-header exists, and the like.

Figure 21:
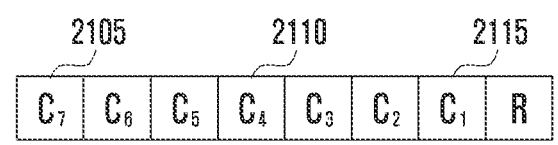
FIG. 21 is a view illustrating a configuration of a bitmap in a payload.

FIG. 21 is a view illustrating a configuration of a bitmap in a payload.

Referring to FIG. 21, the payload is a 1-byte bitmap, wherein a C7 bit 2105 represents a state of a serving cell having an SCell index of 7 (hereinafter a serving cell having an SCell index of x is expressed as an SCell x), a C4 bit 2110 represents a state of an SCell 4, and a C1 bit 2115 represents a state of an SCell 1. When the bit is set to 1, if the relevant SCell is already in an active state, the UE maintains the active state. If the relevant SCell is in an inactive state, the UE transitions to the active state. When the bit is set to zero, if the relevant SCell is in the active state, the UE transitions to the inactive state. If the relevant SCell is already in the inactive state, the UE maintain the inactive state.

In step 2015, the UE checks whether an SCell having a bit set to 1 is an already-activated SCell. When the SCell is an already-activated SCell, the UE proceeds to step 2050. When the SCell is an SCell which is not yet activated, the UE proceeds to step 2020.

In step 2020, the UE checks whether a frequency band of the SCell belongs to a frequency band identical to that of an already-set serving cell (e.g., a PCell) and is adjacent to the frequency band of the PCell.

When the frequency band of the SCell is not the already-set serving cell, the UE proceeds to step 2025. When the frequency band of the SCell is the already-set serving cell, the UE proceeds to step 2030.

In step 2025, the UE starts the transmission of a CQI to the activated SCell from n+x1.

In step 2030, the UE determines whether the condition shown in Table 5 is satisfied. When the condition is satisfied, the UE does not need RF bandwidth reconfiguration, and proceeds to step 2025. When the condition is not satisfied, the UE needs the RF bandwidth reconfiguration, and proceeds to step 2035.

In step 2035, the UE determines that PCell interruption is allowed during a predetermined time period, for example, between a subframe n+m2 and a subframe n+m2+k2, and performs RF reconfiguration during the predetermined time period. m2 is a value defined to enable the HARQ feedback transmission of an A/D MAC CE, and is equal to, for example, 5. k2 may have a value identical to that of k1.

In step 2040, the UE starts the transmission of a CQI to the SCell from a predetermined subframe (e.g., a subframe n+m2+k2+1), and resumes the transmission of a CQI to the PCell.

In step 2045, the UE determines whether the condition shown in Table 6 below is satisfied. The condition shown in Table 6 below is used for the UE to specify an activation operation completion final time point for the SCell. When a certain SCell is activated, the UE performs an operation, such as PDCCH-monitoring of the SCell, Sounding Reference Signal (SRS) transmission, and the like. In order to start the operation, an additional reconfiguration operation is required to transmit/receive an SCell signal after RF bandwidth reconfiguration. A time period required for the additional reconfiguration operation may be changed according to the capability of the UE. The standards define a minimum requirement (i.e., a final time point) with which the UE needs to comply. When the condition shown in Table 6 below is satisfied, the UE may more quickly complete the reconfiguration and a maximum activation delay applied at this time is referred to as "activation delay 1 (ad1)." When the condition shown in Table 6 below is not satisfied, a longer time period may be required to complete the reconfiguration, and a maximum activation delay applied at this time is referred to as "activation delay 2 (ad2)."

TABLE 6

When an A/D MAC CE which activates an SCell is received in a subframe n, a measurement result report control message including a result of measuring an SCell is transmitted within a previous predetermined time period with the subframe n as a reference. Specifically, the transmission of a MAC PDU including a measurement result report control message is started between a subframe n-y and the subframe n. y may be defined as a time period during which a result of measurement is valid when the UE performs the measurement of an SCell in the inactive state. Valid measurement results can be produced when there normally exist measurement samples obtained by performing measurement five times, and since the UE performs measurement once at every DRX cycle or at every time period called measCycleSCell, y may be defined as a larger value among the DRX cycle multiplied by 5 and measCycleSCell multiplied by 5.

When the condition shown in Table 6 is satisfied, the UE proceeds to step 2055, and drives an sCellDeactivationTimer at n+x1 and triggers a Power Headroom Report (PHR) at n+w1. w1 is an integer which specifies a subframe related to a time point of completing the activation of the SCell, and has a maximum value of ad1. In other words, the UE triggers the PHR at the time point of completing the activation of the SCell, and the activation completion needs to be completed until n+ad1 at the latest.

When the condition shown in Table 6 is not satisfied, the UE proceeds to step 2060, and drives the sCellDeactivationTimer at n+x1 and triggers a PHR at n+w2. w2 is an integer which specifies a subframe related to a time point of completing the activation of the SCell, and has a maximum value of ad2. In other words, the UE triggers the PHR at the time point of completing the activation of the SCell, and the activation completion needs to be completed until n+ad2 at the latest.

In step 2050, the UE re-drives the sCellDeactivationTimer at n+x1 and triggers the PHR.

The sCellDeactivationTimer deactivates an SCell through which data is not transmitted/received during a predetermined time period, and one sCellDeactivationTimer is configured for each SCell. When an SCell is activated, the UE drives the timer, and re-drives the timer whenever a downlink assignment or an uplink grant for an SCell is received, or whenever the SCell is re-activated.

A PHR is control information that the UE reports the current available transmission output to the ENB. When an SCell is activated, the UE reports a PHR to the ENB, and reports a transmission output situation of the an SCell to the ENB.

SCell activation types may be divided into three types as follows.

SCell activation 1: when an A/D MAC CE indicating activation to an already-activated SCell is received SCell activation 2: when an A/D MAC CE indicating activation to an deactivated SCell is received and the condition shown in Table 6 is satisfied SCell activation 3: when an A/D MAC CE indicating activation to an deactivated SCell is received and the condition shown in Table 6 is not satisfied An A/D MAC CE may include activation commands for activating multiple SCells, and thus one A/D MAC CE may cause the multiple types of activations to simultaneously occur.

At this time, the UE triggers a PHR only once, and a trigger time point is a time point when the activation of an SCell is completed, wherein the activation of the SCell is completed latest. For example, when an A/D MAC CE has been received in a subframe n and only SCell activation 1 occurs with respect to the A/D MAC CE, the UE triggers a PHR at n+x1. When the A/D MAC CE causes SCell activation 1 to occur in a predetermined SCell and causes SCell activation 2 to occur in another SCell, the UE triggers a PHR after activations of all the SCells are completed, and triggers the PHR until at least n+ad1. When the A/D MAC CE causes SCell activation 3 to occur, the UE triggers a PHR after activations of all the SCells are completed, and triggers the PHR until at least n+ad2.

Figure 14:
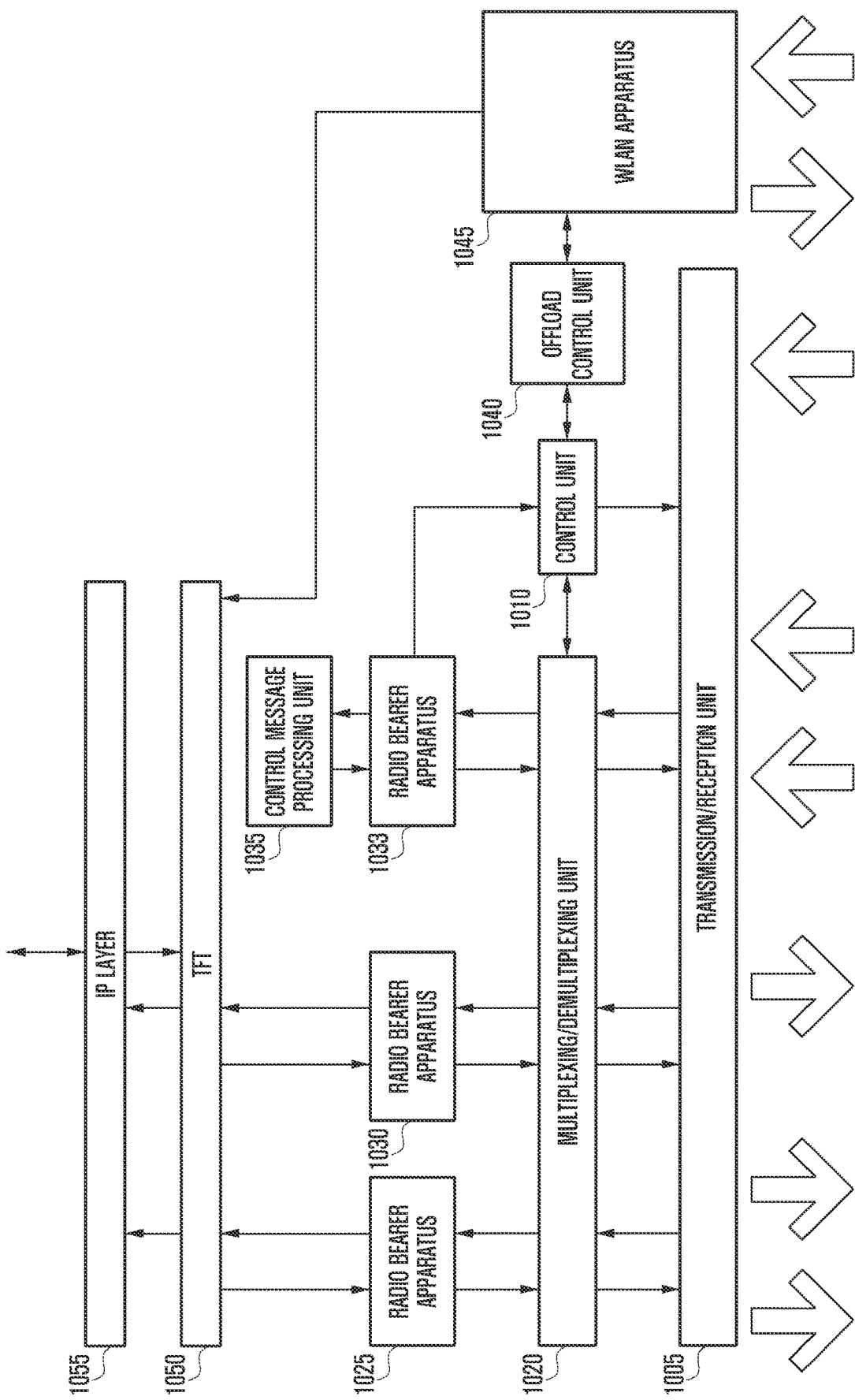
FIG. 14 is a block diagram illustrating a configuration of a user equipment according to an embodiment of the present invention.

FIG. 14 is a block diagram illustrating a configuration of a UE according to an embodiment of the present invention.

Referring to FIG. 14, the UE according to an embodiment of the present invention includes a transmission/reception unit 1005, a control unit 1010, a multiplexing/demultiplexing unit 1020, a control message processing unit 1035, a radio bearer apparatus 1025, 1030 and 1033, an offload control unit 1040, a WLAN apparatus 1045, a TFT 1050, an IP layer 1055, and the like.

The transmission/reception unit 1005 receives data and predetermined control signals through a downlink channel of a serving cell and transmits data and predetermined control signals through an uplink channel. When multiple serving cells are set, the transmission/reception unit 1005 transmits and receives data and control signals through the multiple serving cells.

The multiplexing/demultiplexing unit 1020 multiplexes data of the radio bearer apparatus 1025, 1030 and 1033, or demultiplexes data received from the transmission/reception unit 1005 and delivers the demultiplexed data to an appropriate radio bearer apparatus.

The radio bearer apparatus 1025, 1030 and 1033 includes a PDCP entity and an RLC entity, and processes a packet delivered from the TFT 1050.

The control message processing unit 1035 is an RRC layer entity, and processes a control message received from the ENB and performs a necessary operation. For example, the control message processing unit 1035 receives a RRC control message, and delivers WIFI-related information to the control unit and the offload control unit 1010.

The control unit 1010 controls the transmission/reception unit 1005 and the multiplexing/demultiplexing unit 1015 to identify the scheduling command (e.g., uplink grants) received by the transmission/reception unit 1005 and to perform uplink transmission by using appropriate transmission resource at an appropriate time point, and controls a DRX.

The offload control unit 1040 performs a control operation related to all procedures for offload. More particularly, the offload control unit 1040 performs a required control operation related to a UE operation illustrated in FIG. 4, FIG. 5, FIG. 7, FIG. 8, FIG. 9, and the like. Although not illustrated in the drawings for convenience, the offload control unit 1045 may be connected to the control unit 1010, the control message processing unit 1035, the radio bearer apparatus 1025, 1030 and 1033, the TFT 1050, and the like.

According to predetermined criteria, the TFT 1050 delivers IP packets delivered by the IP layer to an appropriate radio bearer apparatus, or to the WLAN apparatus.

Figure 15:
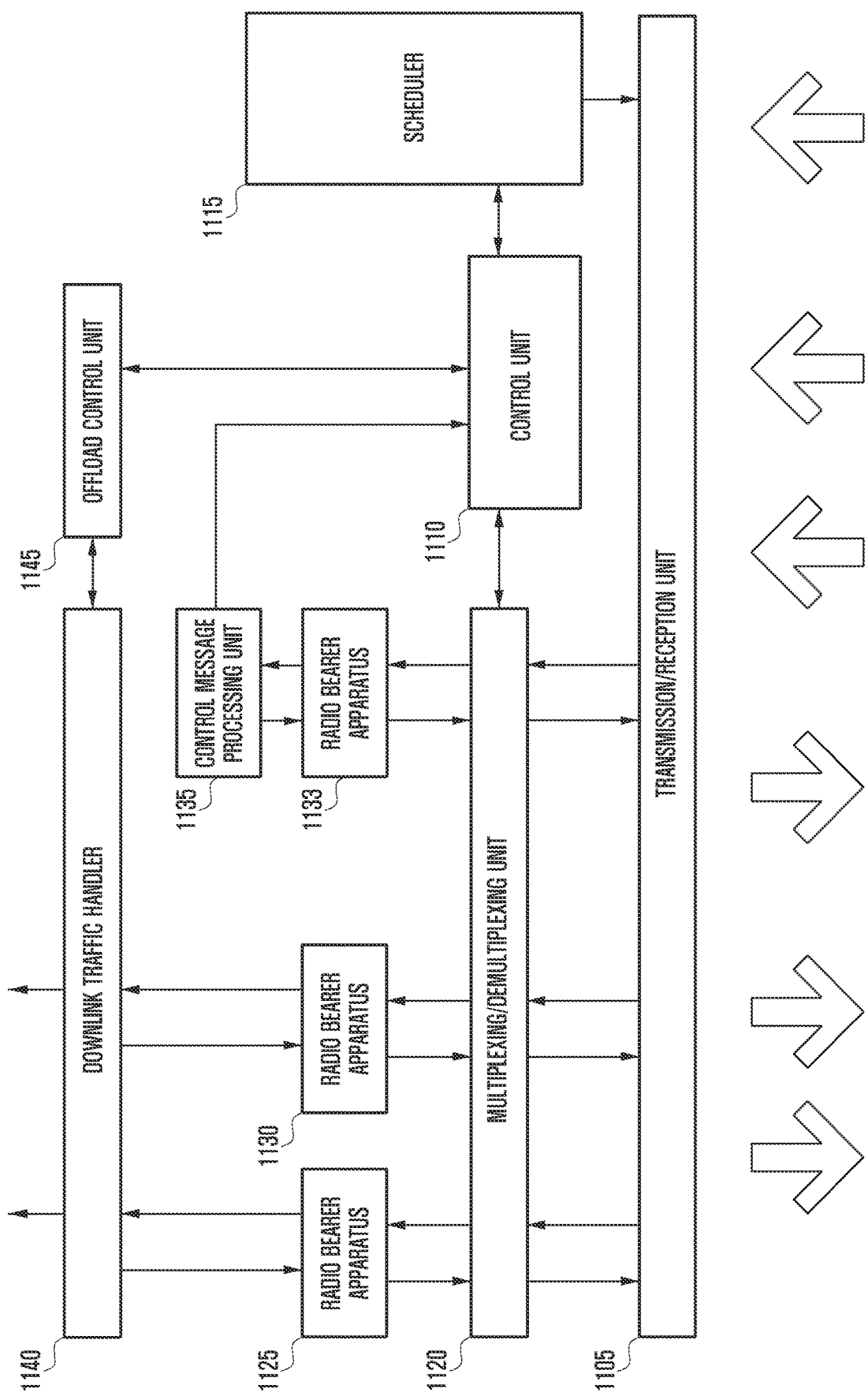
FIG. 15 is a block diagram illustrating a configuration of a base station device according to an embodiment of the present invention.

FIG. 15 is a block diagram illustrating a configuration of an ENB device according to an embodiment of the present invention.

Referring to FIG. 15, the ENB device according to an embodiment of the present invention includes a transmission/reception unit 1105, a control unit 1110, a multiplexing/demultiplexing unit 1120, a control message processing unit 1135, a radio bearer apparatus 1125, 1130 and 1133, a scheduler 1115, a downlink traffic handler 1140, and an offload control unit 1145.

The transmission/reception unit 1105 transmits data and predetermined control signals through a downlink carrier, and receives data and predetermined control signals through an uplink carrier.

The multiplexing/demultiplexing unit 1120 multiplexes data of the radio bearer apparatus 1125, 1130 and 1133, or demultiplexes data received by the transmission/reception unit 1105 and delivers the demultiplexed data to the appropriate higher layer processing unit 1125 and 1130 or control unit 1110.

The control message processing unit 1135 processes a control message transmitted by the UE and performs a necessary operation, or generates a control message to be transmitted to the UE and delivers the generated control message to the lower layer.

The radio bearer apparatus 1125, 1130 and 1133 configures data delivered by an S-GW or another ENB into an RLC PDU, and delivers the RLC PDU to the multiplexing/demultiplexing unit 1120, or configures an RLC PDU delivered by the multiplexing/demultiplexing unit 1120 into a PDCP SDU, and delivers the PDCP SDU to an S-GW or another ENB.

The scheduler 1115 allocates transmission resource to the UE at an appropriate time point in view of a buffer status, a channel status, and the like of the UE, and allows the transmission/reception unit 1105 to process a signal received from the UE, or to transmit a signal to the UE.

The control unit 1110 performs all control operations for transmitting/receiving data in the LTE network and a DRX-related control operation.

The offload control unit 1145 performs a control operation related to all procedures for offload. More particularly, the offload control unit 1145 performs an operation that the ENB needs to perform in relation to a UE operation illustrated in FIG. 4, FIG. 5, FIG. 7, FIG. 8, FIG. 9, and the like, and performs a control operation required for an ENB operation illustrated in FIGS. 4 to 9.

According to the control of the offload control unit 1145, the downlink traffic handler 1140 delivers a downlink PDCP SDU to the appropriate the radio bearer apparatus 1125, 1130 and 1133, or to a WLAN AP.

The invention claimed is:

1. A method by a terminal in a wireless communication system supporting carrier aggregation (CA), the method comprising:
    receiving a first control message for requesting capability information of the terminal, wherein the first control message includes a value indicating a type of radio access technology (RAT), the value being set as an evolved universal terrestrial radio access (EUTRA);
    reporting the capability information corresponding to the value being set as the EUTRA, wherein the capability information includes a list of frequency band combinations supported for the CA and information indicating whether the terminal allows an interruption on a primary cell for a predetermined band combination;
    receiving a second control message of radio resource control (RRC) connection reconfiguration for adding or releasing a secondary cell; and
    performing an RRC connection reconfiguration procedure based on the second control message,
    wherein an interruption of up to 5 subframes on the primary cell during the RRC connection reconfiguration procedure is allowed for the terminal, in case that the primary cell is in the same frequency band as the secondary cell being added or released.

2. A terminal in a wireless communication system supporting carrier aggregation (CA), the terminal comprising:
    a transmission/reception unit for transmitting and receiving signals; and
    a control unit configured to:
        control the transmission/reception unit to receive a first control message for requesting capability information of the terminal, wherein the first control message includes a value indicating a type of radio access technology (RAT), the value being set as an evolved universal terrestrial radio access (EUTRA),
        control the transmission/reception unit to report the capability information corresponding to the value being set as the EUTRA, wherein the capability information includes a list of frequency band combinations supported for the CA and information indicating whether the terminal allows an interruption on a primary cell for a predetermined band combination,
        control the transmission/reception unit to receive a second control message of radio resource control (RRC) connection reconfiguration for adding or releasing a secondary cell, and
        perform an RRC connection reconfiguration procedure based on the second control message,
    wherein an interruption of up to 5 subframes on the primary cell during the RRC connection reconfiguration procedure is allowed for the terminal, in case that the primary cell is in the same frequency band as the secondary cell being added or released.

3. A method by a base station in a wireless communication system supporting carrier aggregation (CA), the method comprising:
    transmitting to a terminal a first control message for requesting capability information of the terminal, wherein the first control message includes a value indicating a type of radio access technology (RAT), the value being set as an evolved universal terrestrial radio access (EUTRA);
    receiving from the terminal the capability information corresponding to the value being set as the EUTRA, wherein the capability information includes a list of frequency band combinations supported for the CA and information indicating whether the terminal allows an interruption on a primary cell for a predetermined band combination;
    transmitting a second control message of radio resource control (RRC) connection reconfiguration for adding or releasing a secondary cell; and
    performing an RRC connection reconfiguration procedure based on the second control message,
    wherein an interruption of up to 5 subframes on the primary cell during the RRC connection reconfiguration procedure is allowed for the terminal, in case that the primary cell is in the same frequency band as the secondary cell being added or released.

4. A base station in a wireless communication system supporting carrier aggregation (CA), the base station comprising:
    a transmission/reception unit for transmitting and receiving signals; and
    a control unit configured to:
        control the transmission/reception unit to transmit to a terminal a first control message for requesting capability information of the terminal, wherein the first control message includes a value indicating a type of radio access technology (RAT), the value being set as an evolved universal terrestrial radio access (EUTRA),
        control the transmission/reception unit to receive from the terminal the capability information corresponding to the value being set as the EUTRA, wherein the capability information includes a list of frequency band combinations supported for the CA and information indicating whether the terminal allows an interruption on a primary cell for a predetermined band combination,
        control the transmission/reception unit to transmit a second control message of radio resource control (RRC) connection reconfiguration for adding or releasing a secondary cell, and
        perform an RRC connection reconfiguration procedure based on the second control message, wherein an interruption of up to 5 subframes on the primary cell during the RRC connection reconfiguration procedure is allowed for the terminal, in case that the primary cell is in the same frequency band as the secondary cell being added or released.

* * * * *